(12) United States Patent
Shealy

(10) Patent No.: US 11,703,014 B2
(45) Date of Patent: Jul. 18, 2023

(54) FLEXURALLY ACTUATED SELF-SEALING PLUNGER APPARATUS

(71) Applicant: General Electric Company, Schenectady, NY (US)

(72) Inventor: James Shealy, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 17/362,391

(22) Filed: Jun. 29, 2021

(65) Prior Publication Data
US 2022/0412464 A1    Dec. 29, 2022

(51) Int. Cl.
  *F02K 1/80*    (2006.01)
  *F16J 15/08*    (2006.01)
  *F02C 7/28*    (2006.01)
  *F01D 11/00*    (2006.01)

(52) U.S. Cl.
  CPC ........... *F02K 1/805* (2013.01); *F16J 15/0887* (2013.01); *F16J 15/0893* (2013.01); *F01D 11/005* (2013.01); *F02C 7/28* (2013.01); *F05D 2240/55* (2013.01); *F05D 2240/59* (2013.01)

(58) Field of Classification Search
  CPC .. F16J 15/0887; F16J 15/0893; F16J 15/3436; F16C 7/28; F01D 11/005; F05D 2240/55; F05D 2240/59; F02K 1/805
  See application file for complete search history.

(56) References Cited

U.S. PATENT DOCUMENTS

| | | |
|---|---|---|
| 3,121,995 A | 2/1964 | Albani |
| 3,167,206 A | 1/1965 | Nelson |
| 3,422,981 A | 1/1969 | OBrien |
| 4,575,006 A | 3/1986 | Madden |
| 4,575,099 A | 3/1986 | Nash |
| 4,739,932 A | 4/1988 | Szuminski |
| 4,815,276 A | 3/1989 | Hansel |
| 4,917,302 A | 4/1990 | Steinetz |

(Continued)

FOREIGN PATENT DOCUMENTS

| | | |
|---|---|---|
| DE | 3026245 | 11/1997 |
| EP | 1491931 | 12/2004 |

(Continued)

OTHER PUBLICATIONS

USPTO; U.S. Appl. No. 17/407,439, Application filed Aug. 20, 2021, entitled "Plunger Seal Assembly and Sealing Method,".

(Continued)

*Primary Examiner* — Nicholas L Foster
(74) *Attorney, Agent, or Firm* — Fitch, Even, Tabin & Flannery LLP

(57) ABSTRACT

An apparatus for sealing such a gap may be a plunger seal which may include a flap arm comprising resilient sheets and a wall arm comprising resilient sheets. A proximal end portion of the flap arm may include a closeout seal coupled to the flap. A proximal end portion of the wall arm may include a plunger having a geometry corresponding to that of the closeout seal so the plunger may be matingly received by the closeout seal. When positioned in a gap, the plunger seal may exert a force to urge the flap arm towards the flap and to urge the wall arm and resilient sheet towards the structure to seal the gap.

22 Claims, 16 Drawing Sheets

(56) References Cited

U.S. PATENT DOCUMENTS

| | | | | |
|---|---|---|---|---|
| 5,115,979 | A | * | 5/1992 | Ellerhorst ............... F02K 1/805 |
| | | | | 239/127.3 |
| 5,143,292 | A | | 9/1992 | Corsmeier |
| 5,288,020 | A | | 2/1994 | Pirker |
| 5,323,965 | A | * | 6/1994 | Froemming .............. B64C 7/00 |
| | | | | 239/265.37 |
| 5,417,441 | A | | 5/1995 | Hill |
| 5,522,546 | A | | 6/1996 | Jarvis |
| 5,676,312 | A | | 10/1997 | Lapergue |
| 6,702,300 | B1 | | 3/2004 | Steinetz |
| 7,775,048 | B2 | * | 8/2010 | Grammel, Jr. ....... F16J 15/0893 |
| | | | | 60/770 |
| 9,016,695 | B2 | | 4/2015 | Treat |
| 9,103,298 | B2 | | 8/2015 | Gormley |
| 9,341,120 | B2 | | 5/2016 | Barry, Jr. |
| 9,810,085 | B2 | | 11/2017 | McMahon |
| 10,513,939 | B2 | | 12/2019 | Roberge |
| 10,550,707 | B2 | | 2/2020 | Boeck |
| 10,969,015 | B2 | | 4/2021 | George |
| 11,047,481 | B2 | | 6/2021 | Bidkar |
| 2008/0000236 | A1 | * | 1/2008 | Grammel ............... F02K 1/805 |
| | | | | 60/770 |
| 2013/0033005 | A1 | * | 2/2013 | Treat ..................... F16J 15/061 |
| | | | | 277/637 |
| 2013/0341872 | A1 | * | 12/2013 | Barry, Jr. ............... F02K 1/002 |
| | | | | 277/561 |
| 2016/0076391 | A1 | | 3/2016 | Guinn |
| 2017/0146130 | A1 | | 5/2017 | Yanagisawa |
| 2018/0149032 | A1 | | 5/2018 | Boeck |
| 2018/0202659 | A1 | | 7/2018 | Stieg |
| 2018/0328313 | A1 | | 11/2018 | Senofonte |
| 2018/0335143 | A1 | | 11/2018 | George |
| 2019/0170007 | A1 | | 6/2019 | Davis |
| 2019/0203842 | A1 | | 7/2019 | Bidkar |
| 2022/0042423 | A1 | | 2/2022 | Hopper |
| 2022/0403798 | A1 | * | 12/2022 | Shealy ................. F02K 1/1207 |
| 2022/0412266 | A1 | * | 12/2022 | Shealy ..................... F02C 7/28 |
| 2023/0054950 | A1 | | 2/2023 | Shealy |

FOREIGN PATENT DOCUMENTS

| | | |
|---|---|---|
| EP | 2511481 | 10/2012 |
| EP | 3744964 | 12/2020 |
| EP | 4086436 | 11/2022 |
| FR | 3127024 | 3/2023 |
| FR | 3127025 | 3/2023 |
| FR | 3127269 | 3/2023 |
| KR | 100440720 | 3/2003 |

OTHER PUBLICATIONS

USPTO; U.S. Appl. No. 17/407,439; Non-Final Office Action dated Dec. 9, 2022; (pp. 15).

USPTO; U.S. Appl. No. 17/567,385; Application filed Jan. 3, 2022, entitled "Plunger Seal Apparatus and Sealing Method".

USPTO; U.S. Appl. No. 17/567,385; Non-Final Office Action dated Mar. 8, 2023; (pp. 9).

USPTO; U.S. Appl. No. 17/578,717; Application filed Jan. 19, 2022, entitled "Seal Assembly and Sealing Method".

USPTO; U.S. Appl. No. 17/578,717; Notice of Allowance dated Mar. 23, 2023; (pp. 12).

USPTO; U.S. Appl. No. 17/578,717; Notice of Allowance dated Dec. 12, 2022; (pp. 12).

USPTO; U.S. Appl. No. 17/578,717; Restriction Requirement dated Sep. 20, 2022; (pp. 7).

USPTO; U.S. Appl. No. 17/352,605; Notice of Allowance and Fees Due (PTOL-85) dated Jan. 18, 2023; (pp. 1-9).

USPTO; U.S. Appl. No. 17/361,479; Notice of Allowance and Fees Due (PTOL-85) dated Jan. 31, 2023; (pp. 1-9).

USPTO; U.S. Appl. No. 17/361,479; Notice of Allowance and Fees Due (PTOL-85) dated Feb. 6, 2023; (pp. 1-2).

USPTO; U.S. Appl. No. 17/361,479; Notice of Allowance and Fees Due (PTOL-85) dated Apr. 13, 2023; (pp. 1-9).

USPTO; U.S. Appl. No. 17/352,605; Notice of Allowance and Fees Due (PTOL-85) dated May 9, 2023; (pp. 1-9).

* cited by examiner

FLEXURALLY ACTUATED SELF-SEALING PLUNGER APPARATUS

GOVERNMENT INTERESTS

This invention was made with United States Government support. The Government has certain rights in this invention.

TECHNICAL FIELD

This technical field relates generally to dynamic seals for sealing a gap between a movable component and a stationary structure and, more specifically, to dynamic seals usable in a gas turbine engine exhaust nozzle.

BACKGROUND

A gas turbine engine, such as a gas turbine engine for powering an aircraft, may include an exhaust nozzle downstream of the turbine. The exhaust nozzle may include a movable flap positioned between nozzle sidewalls. The flap may be actuated via a series of linkages to control a two-dimensional area within the nozzle to direct and accelerate the flow of core air from the engine for the purpose of thrust. Gaps between the flap and the nozzle sidewalls may create channels through which core air may flow, for example, due to a pressure gradient between the nozzle core and ambient environment surrounding the nozzle. Leakage of core air from the nozzle core to the ambient environment may reduce the thrust and efficiency of the engine.

BRIEF DESCRIPTION

Aspects and advantages of the present disclosure will be set forth in part in the following description, or may be learned through practice of the present disclosure.

In an aspect of the present disclosure, a seal apparatus includes a first seal, a second seal, a closet out seal and a plunger. The first seal has a first proximal end portion and a first distal end portion. The second seal has a second proximal end portion and a second distal end portion, the second distal end portion coupled to the first distal end portion, and the second seal opposite the first seal and defining an interior space therebetween. The closeout seal is attached to the first proximal end portion of the first seal. The plunger is attached to the second proximal end portion of the second seal, and the plunger having a geometry corresponding to a geometry of the closeout seal and the plunger is matingly received by the closeout seal to seal the interior space. The first seal biases away from the second seal.

In another aspect of the present disclosure, a seal assembly comprises a first seal, a second seal, a closet out seal and a plunger. The first seal having a first proximal end portion and a first distal end portion and defining a first plenum; a second seal opposite the first seal. The second seal having a second proximal end portion, and a second distal end portion coupled to the first distal end portion of the first seal and defining a second plenum in fluid communication with the first plenum. The closeout seal is attached to the first proximal end portion of the first seal and defining an interior cavity in fluid communication with the first plenum. The plunger is attached to the second proximal end portion of the second seal and matingly received by the closeout seal. The interior cavity of the closeout seal is configured to receive a supply of fluid to thermally regulate the seal assembly to seal a gap between a moveable flap and a stationary structure.

In another aspect of the present disclosure, a method of sealing a dynamic gap using a first seal apparatus, which includes a first seal, a second seal, a closeout seal, and a first plunger. The first seal having a first proximal end portion and a first distal end portion. The second seal having a second proximal end portion and a second distal end portion coupled to the first distal end portion of the first seal, the second seal opposite the first seal and forming an interior space therebetween. The closeout seal attached to the first proximal end portion of the first seal. The plunger attached to the second proximal end portion of the second seal, wherein the first plunger is matingly received by a recess in the closeout seal to seal the interior space, and wherein the first seal biases away from the second seal to seal the gap. The method including contacting at least one surface defining the dynamic gap with the first plunger and moving at least the plunger automatically relative to the recess in response to movement in the at least one surface.

These and other features, aspects and advantages of the present disclosure and/or embodiments will become better understood with reference to the following description and appended claims. The accompanying drawings, which are incorporated in and constitute a part of this specification illustrate embodiments of the present disclosure and, together with the description, serve to better explain the principles of the present disclosure.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Figure 1:
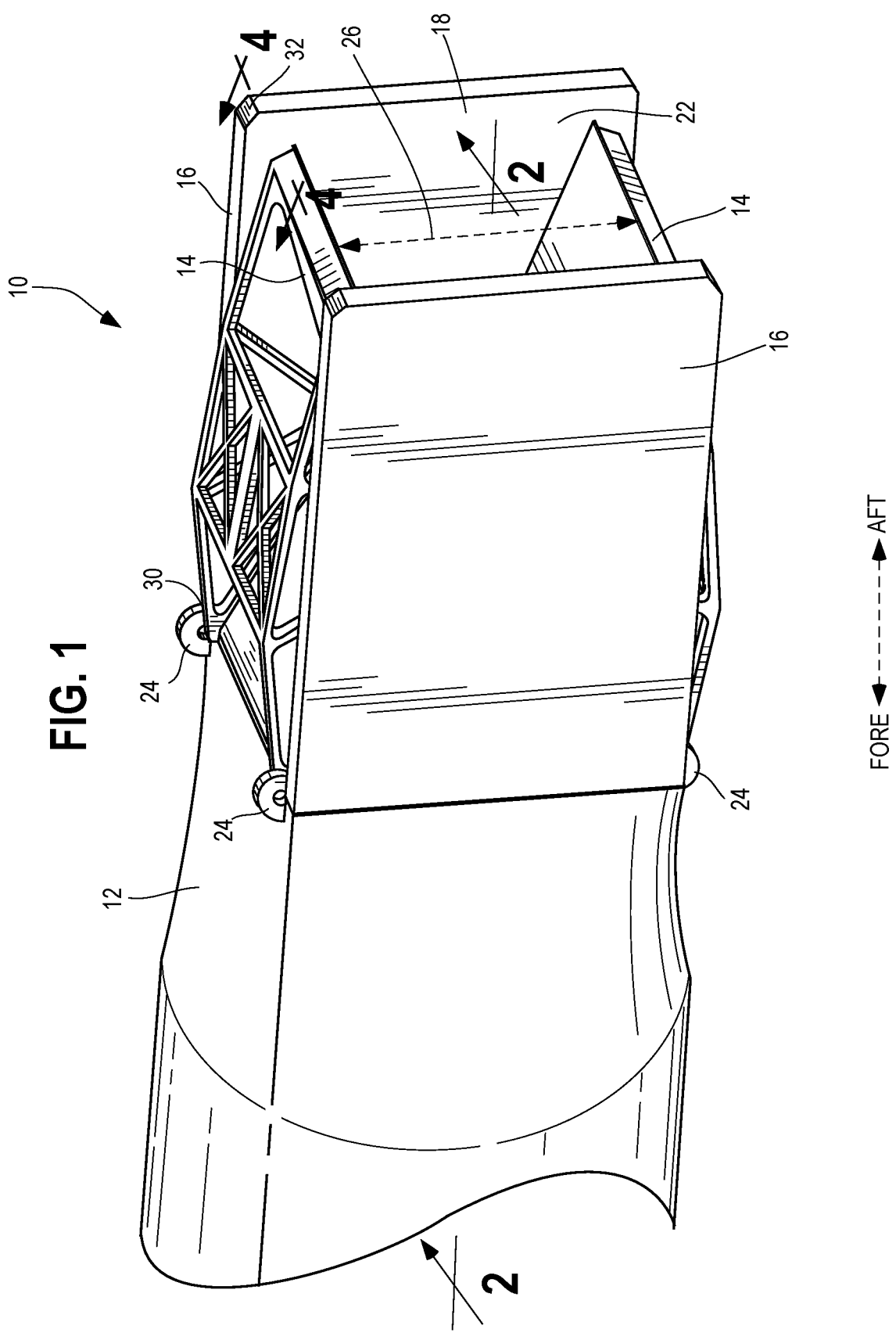
FIG. 1 is a perspective view of an exemplary gas turbine engine exhaust nozzle assembly, in accordance with some embodiments.

Elements in the figures are illustrated for simplicity and clarity and have not necessarily been drawn to scale. For example, the dimensions and/or relative positioning of some of the elements in the figures may be exaggerated relative to other elements to aid in understanding various embodiments. Also, common but well-understood elements that are useful or necessary in a commercially feasible embodiment are often not depicted to facilitate a less obstructed view of these various embodiments.

DETAILED DESCRIPTION

To reduce the size of gaps between the flap and the nozzle sidewalls and to seal core air within the nozzle core, a seal assembly may be positioned between the nozzle flap and the sidewall. In some instances, liners may be mounted to the nozzle sidewalls via one or more hangar structures. When a nozzle sidewall includes a liner, a seal assembly may be positioned between the flap and the sidewall liner, such that the seal seals against the sidewall liner rather than directly to the nozzle sidewall.

During operation of the nozzle, the flap may move in one or more directions relative to the nozzle sidewall. Thus, the seal assembly for the gap between the flap and nozzle sidewall may need to facilitate sliding motion. For example, the seal assembly may need to facilitate the sliding of the seal assembly along the nozzle sidewall while still maintaining a seal between the nozzle flap and the sidewall.

In addition to accommodating sliding motion along the sidewall, the seal assembly may also need to accommodate dynamic variations in the size of the gap between the nozzle flap and the sidewall and/or the liner. For example, the sidewall liner may distort due to pressure and temperature variations within the nozzle. In addition, although generally stationary, the nozzle sidewall may also take on an uneven profile, deflect or shift towards or away from the flap. Such distortions may impact the size of the gap between the flap and the nozzle sidewall and/or the liner. Accordingly, the seal assembly may need to accommodate for variations in the size of the gap between the flap and the nozzle sidewall and/or the liner. Further, the seal assembly may need to conform to the nozzle sidewall and/or the liner when the nozzle sidewall and/or liner, or portions thereof, distort or move.

Therefore, there remains a desire to have a dynamic seal that more effectively and efficiently controls or prohibits core air from flowing both to the ambient environment at the nozzle and into the structure of the dynamic seal itself.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

With reference to FIGS. 1-4, there is illustrated a gas turbine engine 12 that produces core air flow. At the aft of the gas turbine engine 12 is an adjustable nozzle assembly 10 to control the effect of the discharged core air. The adjustable nozzle assembly 10 includes upper and lower flaps 14 mounted for movement relative to one another between two opposing corresponding sidewalls 16. A gap 42 is located between outer edges of the flaps 14 and the corresponding sidewalls 16. This gap 42 would allow air to exhaust inefficiently to the ambient surroundings without seals. As illustrated in FIGS. 5-14, there is a plunger seal 50 that controls or even prevents this core air from exhausting to the surrounding. The plunger seal 50 includes a flap arm 52 that engages the flap 14 and a wall arm 54 that engages the sidewall 16. The seal 50 is resilient such that the flap arm 52 and the wall arm 54 bias away from one another when pre-loaded in the gap 42. Ends 68, 70 of the arms 52, 54 cooperate to control or prevent core air from entering an interior space 72 between the arms 52, 54. A plunger 66 on the wall arm 54 cooperates with a closeout seal 61 on the flap arm 52 to seal the interior space 72. The resilient nature of the seal 50 allows the arms 52, 54 to adapt to distortion in the gap 42 created by the sidewalls 16.

In some embodiments, the plunger seal 50 or portions thereof may be made as a flexure component; that is, a flexible element engineered to be compliant in specific degrees of freedom. The plunger 66 rides on flexures (i.e., the arms 52, 54) that restrict the motion of the plunger 66 to specific degrees of freedom. The deflection of the arms 52, 54 also provides the actuation force that drives the plunger 66. The flexure of the arms 52, 54 causes the plunger 66 to move in a predictable manner by restricting, relating, and defining the degrees of freedom of their motion through the shape of the components. That is, the components of the plunger seal 50 move and are related to each other through the bending and torsional strains inside each respective component. In this way, these components are flexurally related, and it is the flexural joints that constrain movement of the components as opposed to sliding movement.

As illustrated in FIGS. 5-14, the plunger seal 50 prevents or controls core air from exhausting to ambient through the gap 42. The plunger seal 50 is self-sealing in that it prevents or controls core air from exhausting to the interior space 72 within the plunger seal 50. The plunger seal 50 is also flexurally actuated. The plunger 66 is mounted to the wall arm 54, which is part of a series of parallel flexural arrangements (i.e., arms 52, 54) which restrict the primary degrees of freedom of motion of the plunger 66 in the X-direction and about a local Y-axis (see FIG. 4). The flap arm 52 comprises a first flexural stage and includes at least two parallel sheets 51, 55 spanning between a base plate 76 and a carriage 74. Similarly, the wall arm 54 comprises a second flexural stage that includes at least two parallel sheets 53, 57 spanning between a secondary plate 78 and the carriage 74.

The base plate 76, the secondary plate 78, and the carriage 74 are sufficiently rigid to prevent undesirable motion resulting from undesirable loads generated by the flap 14 and sidewall 16. In this manner, the arms 52, 54 guide the movement of the plunger in the X-direction while reducing or preventing movement of the plunger 66 in the Y-direction. Restricting movement of the plunger 66 seals the interior space 72 between the wall arm 54 and the flap arm 52 and reduces binding of the plunger 66 during actuation.

In this manner, the plunger seal 50 may undergo deformation and/or motion in specific degrees of freedom when an external force is applied to the plunger seal 50. The arms 52, 54 of the plunger seal 50 may be flexures that relate and restrict motion of the plunger 66 to specific degrees of freedom such that an external force applied to the plunger seal 50 is translated to predictable displacement or motion in the plunger seal 50. The arms 52, 54 restrict, relate, and define the degrees of freedom for the motion of the plunger 66 to seal the gap 42. Further the arms 52, 54 restrict, relate, and define the degrees of freedom for the motion of the plunger 66 to seal the interior space 72 within the plunger seal 50.

Turning back to FIG. 1, one or more of the sidewalls 16 may further include a liner 18 mounted to the sidewall via one or more hangar structures 20. The flaps 14 may be moveable relative the sidewalls 16, which may be generally stationary. By some approaches, the flaps 14 may be pivotally supported by the gas turbine engine 12 at the fore end 30 of the nozzle assembly 10. The flaps 14 may be pivotally supported, for example, by rotating means such as the hinges 24 that couple the flaps 14 to the gas turbine engine 12.

The flaps 14 and the sidewalls 16 define a nozzle core 22 that bounds core air exiting the gas turbine engine 12. Core air from the gas turbine engine 12 flows through the nozzle core 22 to create thrust for the gas turbine engine 12. Core air flows through the nozzle core 22 from a fore end 30 to an aft end 32 of the nozzle assembly 10. The aft end 32 of the nozzle assembly 10 defines a generally rectangular outlet 26 for discharging core air from the nozzle assembly 10 to the ambient environment. In some approaches, the flaps 14 are movable to direct the flow and pressure of core air within the nozzle core 22. For example, the flaps 14 may be vertically movable to adjust the size of the outlet 26 of the nozzle assembly 10.

Figure 2:
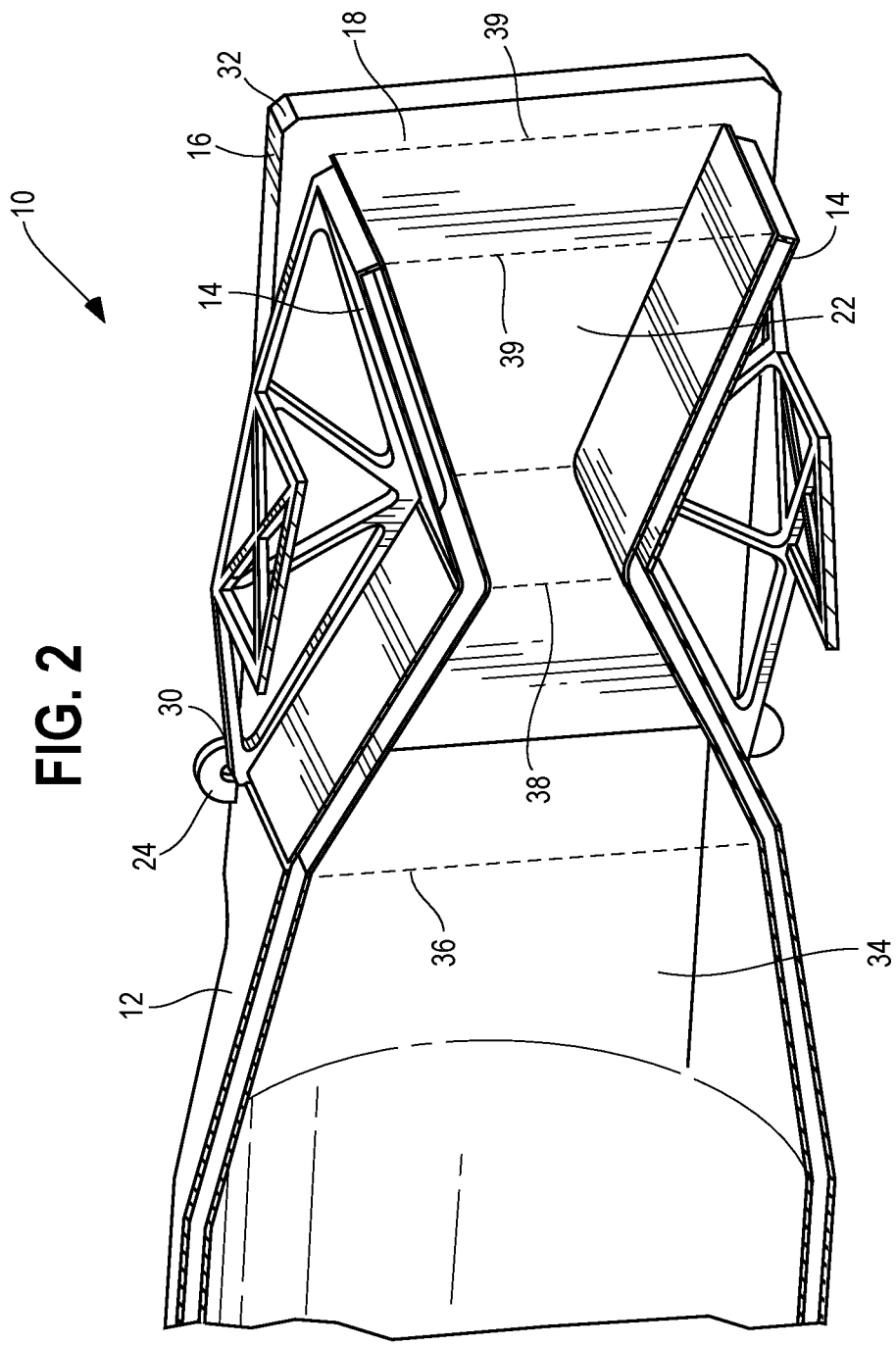
FIG. 2 is a cross-sectional view of the nozzle of FIG. 1 taken along line 2-2 of FIG. 1.

Turning to FIG. 2, an engine core 34 of the gas turbine engine 12 is upstream of the nozzle assembly 10 such that core air flows from the engine core 34 into the nozzle core 22. In some embodiments, the flaps 14 of the nozzle assembly 10 are actuated to vary the one or more cross-sectional areas of the nozzle core 22. In this manner, the nozzle assembly 10 is a variable two-dimensional nozzle assembly. The flaps 14 may be actuated, for example by pivoting about the hinges 24. The nozzle core includes a first cross-sectional area 36, a second cross-sectional area 38, and a third cross-sectional area 39. The flaps 14 control the size of the second cross-sectional area 38 and the third cross-sectional area 39.

During operation of the gas turbine engine 12, the flaps 14 create a pressure gradient in the nozzle core 22 of the nozzle assembly 10. For example, pressure of the core air in the nozzle core 22 decreases from the fore end 30 to the aft end 32 of the nozzle core 22. That is, the pressure of the core air decreases from the first cross-sectional area 36 to the second cross-sectional area 38 to the third cross-sectional area 39.

Figure 3:
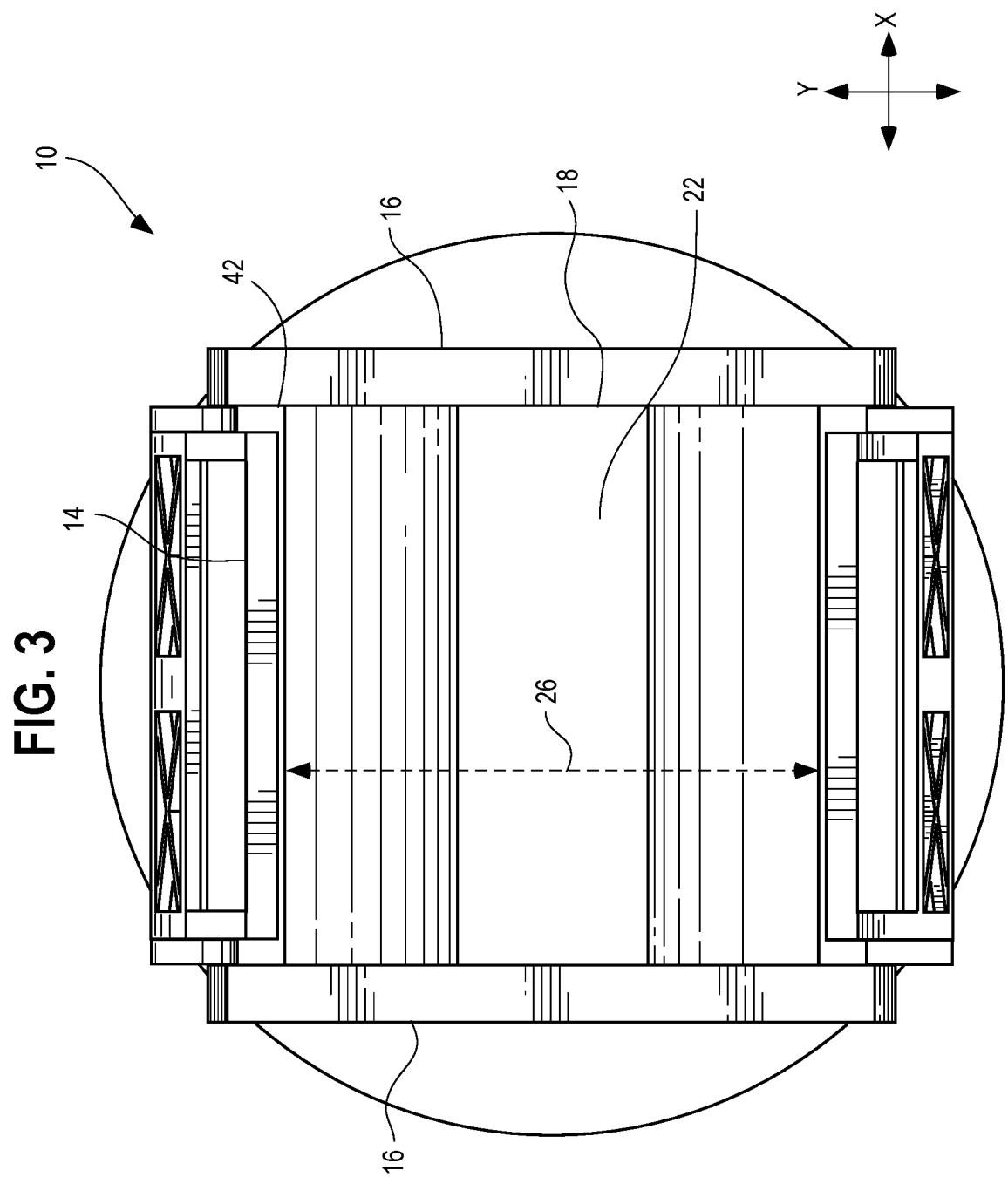
FIG. 3 is an end elevation view of the nozzle of FIG. 1 taken from an aft end of the nozzle assembly.

Turning to FIG. 3, the gap 42 between the flap 14 and may extend along the length of the flap 14 (i.e., from the fore end 30 to the aft end 32 of the nozzle assembly 10 as shown in FIG. 1). The gap 42 may be continuous or interrupted at one or more locations. The size of the gap 42 may vary dynamically during operation of the nozzle assembly 10. During operation, the flaps 14 may move along the Y-direction shown in FIG. 3. This motion of the flaps 14, for example, varies the size of the outlet 26 of the nozzle assembly 10. Additionally, during operation, the sidewall 16 may shift in the X-direction. For example, the pressure of core air in the nozzle core 22 may urge the sidewall 16 away from the flap 14, increasing the size of the gap 42. Accordingly, the gap 42 may be narrower when the nozzle core 22 is at atmospheric pressure than when the nozzle core 22 receives engine core air during operation of the nozzle assembly 10. In addition to motion of the sidewall 16, the liner 18 of the sidewall 16 may also distort during operation, causing the liner 18 to shift along one or more of the X-direction and the Y-direction. Such liner distortion may occur, for example, due to changes in temperature and pressure along the nozzle core 22.

Figure 4:
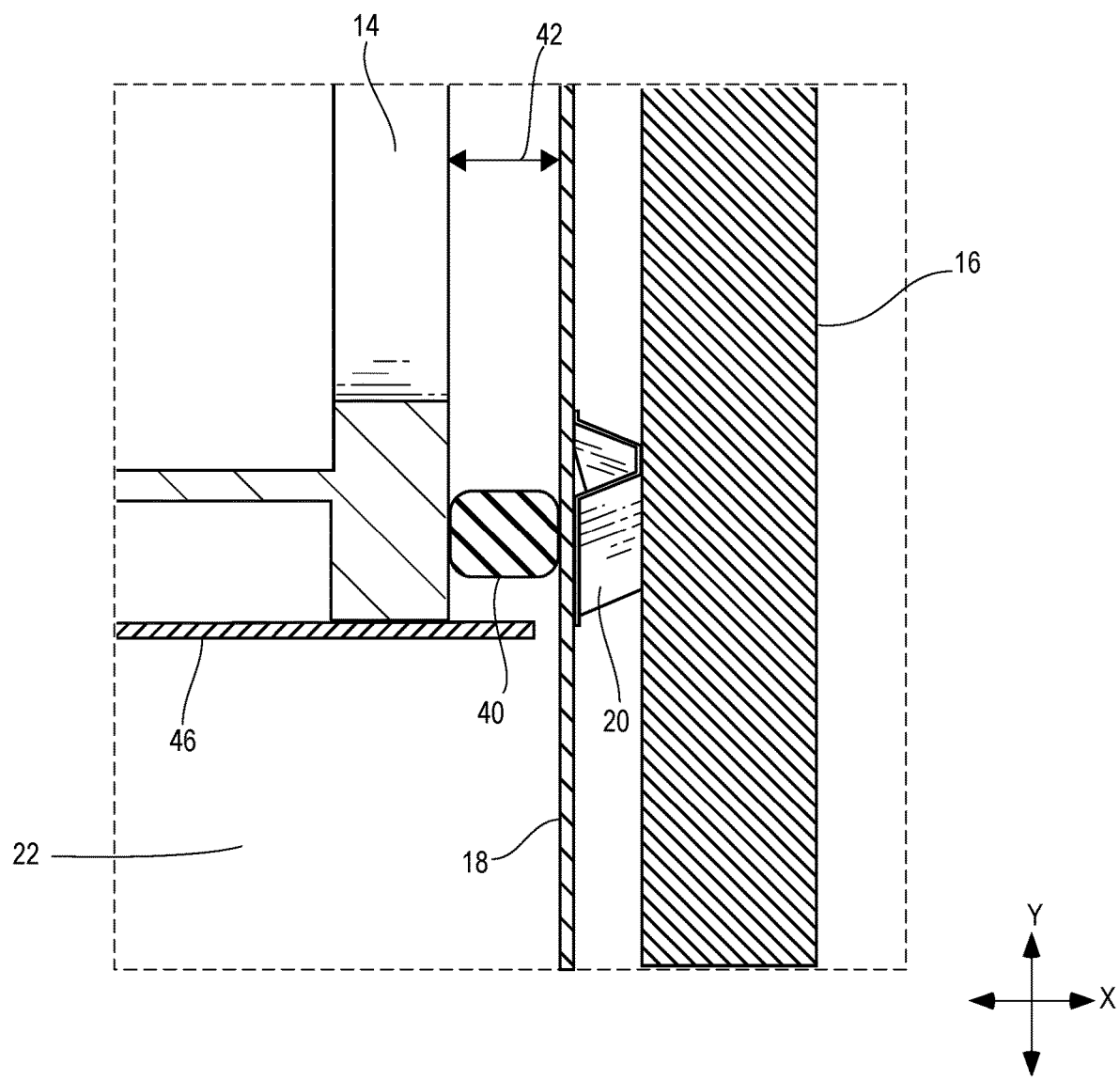
FIG. 4 is an enlarged, cross-sectional view taken along line 4-4 in FIG. 1 of a portion of the nozzle assembly of FIG. 1.

With reference to FIG. 4, the gap 42 extends generally between the flap 14 and sidewall 16. In the exemplary nozzle assembly 10, the sidewall 16 includes the liner 18, which is mounted to the sidewall 16 via hangar structures 20. Accordingly, the gap 42 extends between the flap 14 and the liner 18. The flap 14 may further include a flap liner 46 positioned at an end of the flap 14 adjacent the nozzle core 22. The flap liner 46, or portions thereof, may extend into the gap 42.

The nozzle assembly 10 includes a plunger seal assembly 40 positioned in the gap 42 between the flap 14 and the sidewall 16. The plunger seal assembly 40 bridges the gap 42 between the flap 14 and the sidewall 16 to seal the gap 42. The plunger seal assembly 40 may reduce the size of the gap 42 or eliminate the gap 42. In this manner, the plunger seal assembly 40 reduces the excursion of core air from the nozzle core 22 through the gap 42 which may decrease or effect the flow of core air from the nozzle core 22 to the ambient environment surrounding the nozzle assembly 10. In some embodiments, the plunger seal assembly 40 includes a plunger seal, such as the first plunger seal 50 and/or the second plunger seal 60 depicted in FIGS. 5-14 In some embodiments, the plunger seal assembly 40 may be equipped with integral fluid flow for the purposes of thermal regulation (e.g., heating and/or cooling), such as the plunger seal assembly 140 depicted in FIG. 16.

Figure 5:
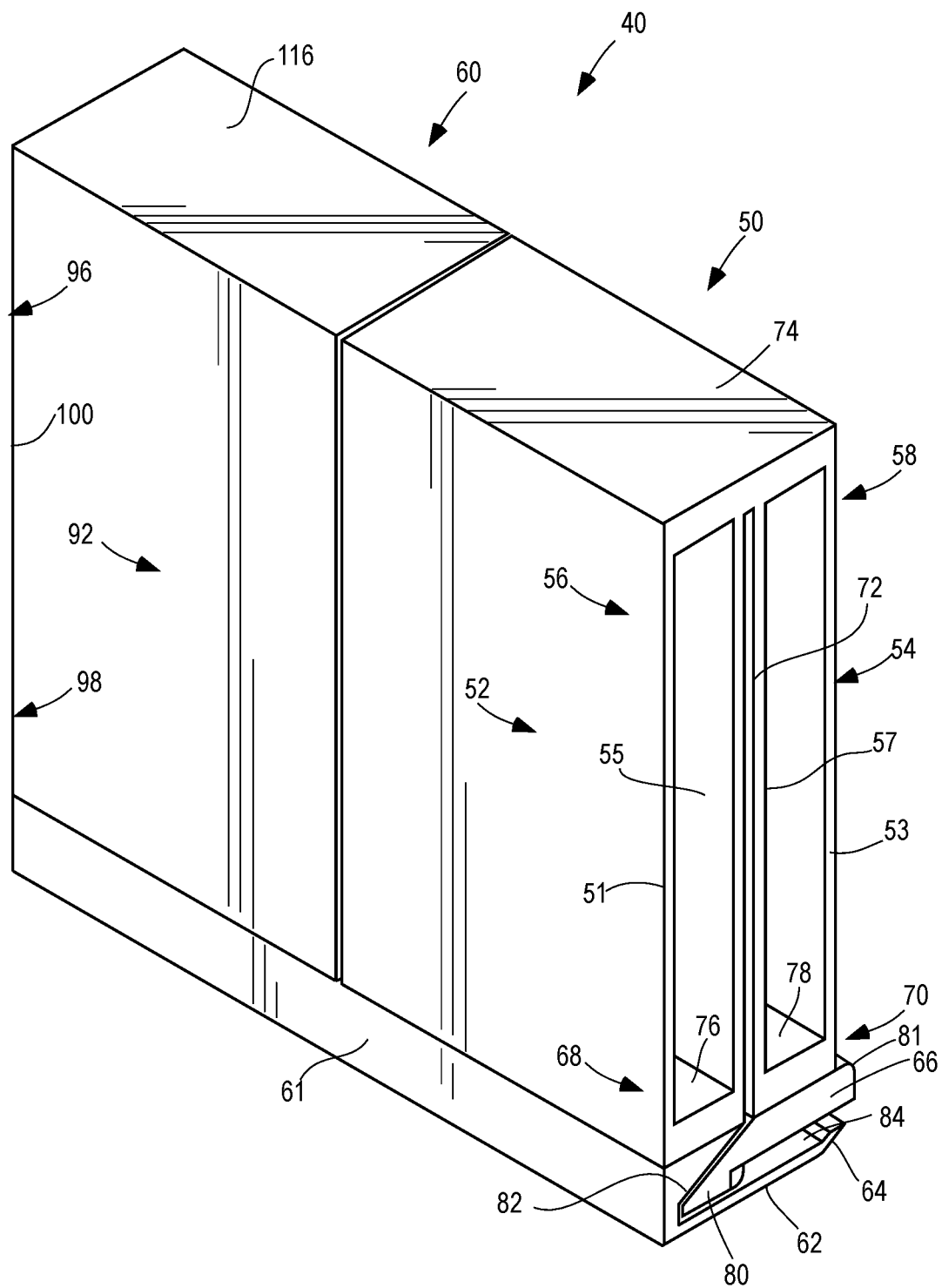
FIG. 5 is a perspective view of a flexurally actuated self-sealing plunger seal assembly including plunger seals shown in a fully compressed state, in accordance with some embodiments.

FIG. 5 illustrates an exemplary plunger seal assembly 40. The plunger seal assembly 40 is resiliently actuation and self-sealing. The plunger seal assembly 40 includes the first plunger seal 50 that is coupled to a second plunger seal 60. The first plunger seal 50 and the second plunger seal 60 are shown in a fully compressed state. A proximal end of the first plunger seal 50 and a proximal end of the second plunger seal 60 are coupled to a movable flap (not shown in FIG. 5) via a closeout seal 61. In some embodiments, the closeout seal 61 positions the first plunger seal 50 and the second plunger seal 60 in a gap between a movable flap 14 and a stationary structure 16. The plungers 66, 118 of the plunger seals 50, 60, respectively, are mounted in a parallel flexural arrangement. The plunger seals 50, 60 or portions thereof, are resilient such that the plunger seals 50, 60 have memory. Due to this resiliency, the plunger seals 50, 60 spring back to their free state after being compressed. When in a state of compression, the plunger seals 50, 60 exert a resilient force that urges the plunger seals 50, 60 toward their free state. To provide resiliency, the plunger seals 50, 60 may be made from one or more resilient materials.

The forces exerted by the plunger seal 50 (and the plunger seal 60) is generated by the flexing and/or compression of the flexures (i.e., resilient sheets 51, 53, 55, 57). The loading of the flap arm 52 at the interface between the flap 14 and the flap arm 52 seals the space between the flap arm 52 and the flap 14. Similarly, the loading of the wall arm 54 at the interface between the sidewall 16 and the wall arm 54 seals the space between the wall arm 54 and the sidewall 16. This interface loading caused by the biasing of the arms 52, 54 is a result of the materials itself, the offset between the wall arm 54 and the flap arm 52, and the length and thickness of the arms 52, 54. While the arms 52, 54 are shown as being the same length, it is also contemplated that they may be different lengths.

The bias of the arms 52, 54, and accordingly the force output, may be adjusted based on the mechanical relationship between the arms 52, 54 and the relative length and thickness of the flexures or resilient sheets 51, 53, 55, 57 comprising the arms 52, 54. With respect to thickness, when the arms 52, 54 are thicker, they may exert a greater force output and increase the preload requirements (i.e., requirements to compress the plunger seal 50). Further, adjusting the thickness of the parallel flexures or resilient sheets 51, 53, 55, 57 changes the bias and force output of the arms 52, 54. Increasing the thickness of the resilient sheets 51, 53, 55, 57 may increase the force exerted by the arms 52, 54 and may help the plunger seal 50 to better resist vibrations or pressure. With respect to length, when the arms 52, 54 are shorter, they may exert a greater force and increase the preload requirements (i.e., the requirements to compress the plunger seal 50).

In some embodiments, the closeout seal 61 is coupled to the moveable flap, such as the flap 14 of the nozzle assembly 10 shown in FIG. 4. The closeout seal 61 may be coupled to the flap 14 via one or more suitable attachment mechanisms, such as via bonding, brazing, welding, nuts and bolts, rivets, etc. The closeout seal 61 may be coupled to the flap 14 to position the first plunger seal 50 and the second plunger seal 60 in the gap 42 depicted in FIG. 4 between the flap 14 and the sidewall 16. For example, the closeout seal 61 may be coupled to the flap 14 of FIG. 4 so that the first plunger seal 50 seals the gap 42 between the flap 14 and the sidewall 16 in the nozzle assembly 10.

The closeout seal 61 extends along the length of the flap 14 (i.e., from a fore to an aft end of the flap 14) and may be continuous along the length of the flap 14. In some approaches, the closeout seal 61 is formed of a single, continuous piece of material along the length of the flap 14. In other approaches, the closeout seal 61 is segmented along the length of the flap 14. In the embodiment depicted in FIG. 5, a continuous closeout seal 61 is shown.

The closeout seal 61 has a geometry which, in some embodiments, defines a recess 82. The closeout seal 61 further includes a skirt 62 extending away from the flap arm 52 and the wall arm 54 of the first plunger seal 50. The skirt 62 also extends away from the flap arm 92 and towards the wall arm 94 (not shown in FIG. 5) of the second plunger seal 60. In some embodiments, the closeout seal 61 may also include a lip 64 disposed at the end of the skirt 62. The lip 64 extends along a length of the closeout seal 61. The lip 64 is on a side of the skirt 62 adjacent the interior space 72 and may be present anywhere along the skirt 62. As shown in FIGS. 5-8, the lip 64 is disposed on the terminal end of the skirt 62. The lip 64 is positioned adjacent the plunger 66 of the first plunger seal 50 and adjacent the plunger 118 (not shown in FIG. 5) of the second plunger seal 60.

In some embodiments, the skirt 62 is fixed and defines a passive gapped restriction between the skirt 62 and the plungers 66, 118. In other embodiments, the skirt 62 is preloaded or actively flexed against the plungers 66, 118. In other embodiments, the skirt 62 is hingedly engaged with the plungers 66, 118, for example, via a spring or pressure load.

Figure 6:
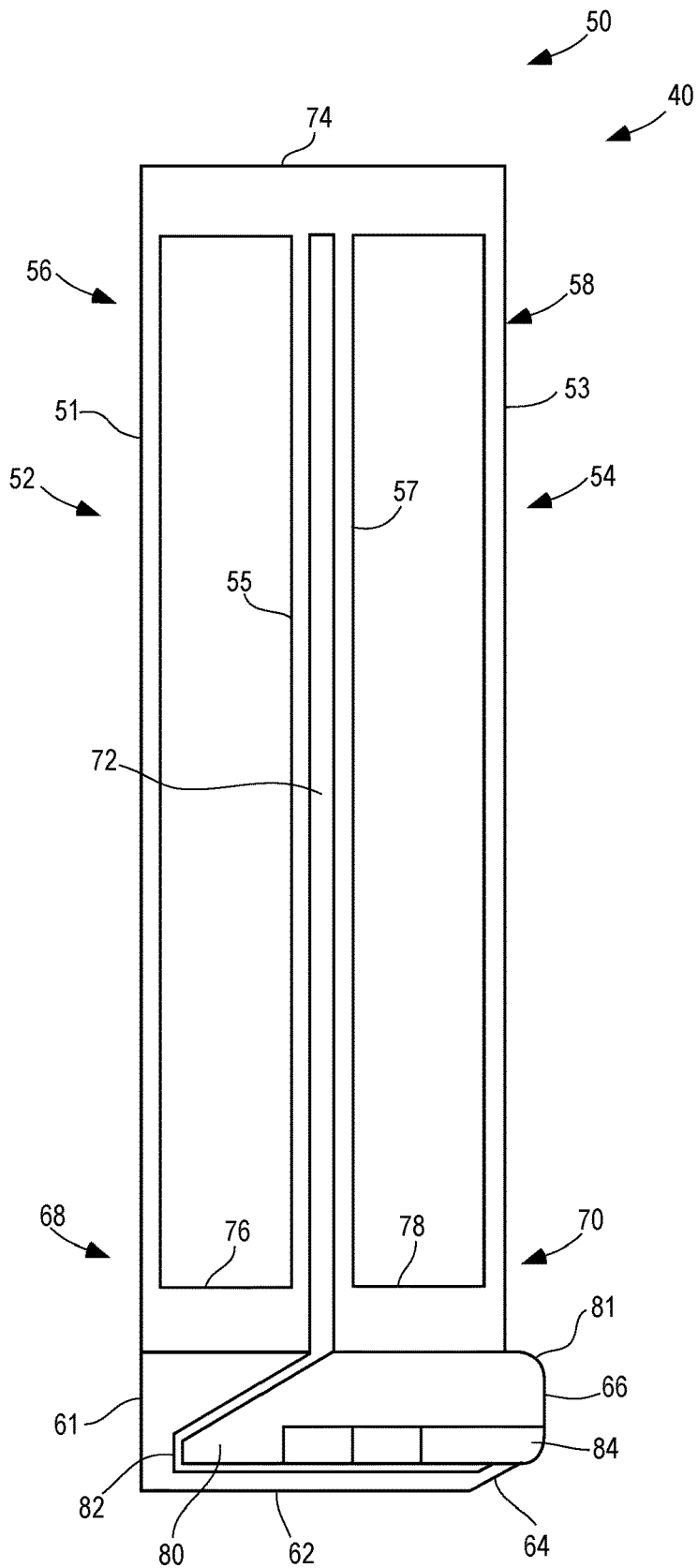
FIG. 6 is a front, side elevation view of the plunger seal assembly of FIG. 5 with the plunger seals shown in a fully compressed state.

Turning to FIG. 6, the first plunger seal 50 and the second plunger seal 60 (FIG. 7) are in a fully compressed state. The first plunger seal 50 is coupled to the closeout seal 61. The first plunger seal 50 includes the flap arm 52 and the wall arm 54. The wall arm 54 is positioned opposite and spaced from the flap arm 52. The first plunger seal 50 defines the interior space 72 bounded at least in part by the flap arm 52 and the wall arm 54.

The plunger seal 50 is a linear motion device that employs arms 52, 54 as parallel flexural linkages. The plunger seal 50 includes a base plate 76, a secondary plate 78, and a carriage 74. In the flap arm 52, the carriage 74 is separated a first distance from and secured to the base plate 76 by an outer resilient sheet 51 and an inner resilient sheet 55. The outer resilient sheet 51 and the inner resilient sheet 55 are flexure blades that are in parallel alignment with each other and pivot at their attachment points with the carriage 74. In the wall arm 54, the carriage 74 is separated a second distance from and secured to the secondary plate 78 by an outer resilient sheet 53 and an inner resilient sheet 57. The outer resilient sheet 53 and the inner resilient sheet 57 are flexure blades that are in parallel alignment with each other and pivot at their attachment points with the carriage 74. The flap arm 52 and the wall arm 54 bias outward away from one another to effect rectilinear movement of the plunger 66, which is affixed to the secondary plate 78, in the X-direction (see FIG. 4). The resilient force or outward bias of the arms 52, 54 drives the plunger 66 along the X-direction while minimizing or preventing rotational movements of the plunger 66 about a Y-axis. The plunger seal 50 is sufficiently flexible about the Y-axis to allow the plunger 66 to twist to match the contour of the sidewall 16. The flexibility of the plunger seal 50 about the Y-axis may be further enhanced by shaping or including cut-outs in the resilient sheets 51, 53, 55, 57 (see FIGS. 9 and 10).

In some embodiments, the flap arm 52 and the wall arm 54 are pre-loaded, for example, when under compression as shown in FIG. 6. When pre-loaded, a resilient force urges the flap arm 52 and the wall arm 54 outwards away from one another. When positioned in a gap, such as a gap between a movable flap and a stationary structure, the resilient force urges the flap arm 52 towards the movable flap and the wall arm 54 towards the stationary structure to seal the gap. In some embodiments, the first plunger seal 50 may be installed in the gap 42 of the nozzle assembly 10 in FIG. 4. When installed in the gap 42, the first plunger seal 50 exerts a force to urge the flap arm 52 towards the flap 14 and to urge the wall arm 54 towards the sidewall 16 to seal the gap 42. The force may be a resilient force that biases the flap arm 52 away from the wall arm 54.

The flap arm 52 includes the outer resilient sheet 51 and the inner resilient sheet 55. The inner resilient sheet 55 is opposite and spaced from the outer resilient sheet 51. Together, the outer resilient sheet 51 and the inner resilient sheet 55 comprise a parallel flexural arrangement. The outer resilient sheet 51 may be an elongate sheet and, in some embodiments, is generally rectangular in shape. The inner resilient sheet 55 may also be an elongate sheet and, in some embodiments, is generally rectangular in shape. The outer resilient sheet 51 and the inner resilient sheet 55 may be about the same shape; however, it is also contemplated that the outer resilient sheet 51 and the inner resilient sheet 55 may be different shapes. In some embodiments, the outer resilient sheet 51 may be generally parallel with the inner resilient sheet 55. The base plate 76 may extend between the outer resilient sheet 51 and the inner resilient sheet 55 at a proximal end portion 68 of the flap arm 52.

The closeout seal 61 is coupled to the flap arm 52, and in particular, to the proximal end portion 68 of the flap arm 52. In some forms, the closeout seal 61 is coupled to the base plate 76. In some embodiments, the closeout seal 61 is integral with the first plunger seal 50. That is, the first plunger seal 50 and closeout seal 61 may be formed of a single, monolithic piece of material. Monolithic, as used herein, refers to a unitary structure lacking interfaces or joints by virtue of the materials of each layer fusing to or melting with the materials of adjacent layers such that the individual layers lose their identity in the final unitary structure. Accordingly, the closeout seal 61 may be integral with the base plate 76. It is also contemplated that the closeout seal 61 may be coupled to the flap arm 52 and/or the base plate 76 via one or more suitable attachment mechanisms, such as via bonding, brazing, welding, nuts and bolts, rivets, etc.

The wall arm 54 includes the outer resilient sheet 53 and the inner resilient sheet 57. The inner resilient sheet 57 is opposite and spaced from the outer resilient sheet 53. Together, the outer resilient sheet 53 and the inner resilient sheet 57 comprise a parallel flexural arrangement. The outer resilient sheet 53 may be an elongate sheet and, in some embodiments, is generally rectangular in shape. The inner resilient sheet 57 may also be an elongate sheet and, in some embodiments, is generally rectangular in shape. The outer resilient sheet 53 and the inner resilient sheet 57 may be about the same shape; however, it is also contemplated that the outer resilient sheet 53 and the inner resilient sheet 57 may be different shapes. In some embodiments, the outer resilient sheet 53 is generally parallel to the inner resilient sheet 57. The secondary plate 78 extends between the outer resilient sheet 53 and the inner resilient sheet 57 at a proximal end portion 70 of the wall arm 54.

A plunger 66 is coupled to the wall arm 54 and, in particular, to the proximal end portion 70 of the wall arm 54. In some forms, the plunger 66 is coupled to the secondary plate 78. In some embodiments, the plunger 66 is integral with the first plunger seal 50. That is, the first plunger seal 50 and the plunger 66 may be formed of a single, monolithic piece of material. Accordingly, the plunger 66 may be integral with the wall arm 54. It is also contemplated that the plunger 66 may be coupled to the wall arm 54 and/or the secondary plate 78 via one or more suitable attachment mechanisms, such as via bonding, brazing, welding, nuts and bolts, rivets, etc.

The plunger 66 has a geometry corresponding to a geometry of the recess 82 of the closeout seal 61. As used herein, corresponding geometries include geometries, profiles, forms, structures, configurations, or shapes that conform partially or fully to each other. In this manner, the closeout seal 61 matingly receives the plunger 66 to seal the interior space 72 of the first plunger seal 50. The secondary seal created by the skirt 62 allows the unique capability to remove core pressure from contributing to the load force of the plunger 66. In addition, when the skirt 62 is nominally gapped with the plunger 66, the skirt 62 provides a frictionless configuration that has relatively low leakage while eliminating the frictional risk of binding. The plunger 66 and the closeout seal 61 may take a variety of shapes, for example, for more advantageous wear, pressure or load tailoring. In some embodiments, the plunger has a nose 81 and tail 80. The nose 81 of the plunger 66 protrudes from the outward-facing side of the plunger 66. When installed in the gap 42, the nose 81 is positioned adjacent to the sidewall 16.

The tail 80 of the plunger 66 corresponds to the recess 82 in the closeout seal 61. When in a compressed state, the tail 80 is received by the recess 82 in the closeout seal 61. The tail 80 is wedge-shaped to help guide the plunger 66 into and out of the recess 82 and so that the closeout seal 61 can taper to support the flexure or resilient sheet 55. The tail 80 protrudes from the plunger 66 toward the closeout seal 61 and is proud of the wall arm 54. By protruding into the closeout seal 61, the tail 80 may increase the travel distance of the plunger 66. That is, the tail 80 may permit the plunger 66 to move a greater distance away from and/or towards the closeout seal 61 to accommodate for variations in the size of the gap in which the first plunger seal 50 is disposed. Including a tail 80 that protrudes from the plunger 66 may also help to reduce the thickness of the first plunger seal 50.

Although the recess 82 is shown in the closeout seal 61 and the tail 80 is shown on the plunger 66 in FIGS. 5-12, it is also contemplated that, in other embodiments, the recess 82 could be disposed on the plunger 66 and the tail 80 could be disposed on the closeout seal 61. In some forms, the plunger 66 is proud of the skirt 62 of the closeout seal 61 on a side of the plunger opposite the tail 80. The plunger 66 is also proud of the wall arm 54 on a side of the plunger opposite the tail 80. In this manner, when the first plunger seal 50 is installed in a gap between a movable flap and stationary structure (e.g., the gap 42 of the nozzle assembly 10 in FIG. 4), the plunger 66, rather than the skirt 62 or the wall arm 54, contacts the stationary structure to seal the gap 42.

The resilient sheets 51, 53, 55, 57 resist deformations in the sidewall 16. The resilient sheets 51, 53, 55, 57 also confine the plunger 66 to operate generally in the same horizontal plane as the closeout seal 61. In operation, the resilient sheets 51, 53, 55, 57 flex or twist when the sidewall 16 deforms while still constraining the plunger 66 to operate generally in the same plane as the closeout seal 61. In this manner, the plunger 66 may move predominately horizontally into and out of the closeout seal 61 to seal the interior space 72 of the plunger seal assembly 40.

In some embodiments, it is contemplated that one or more portions of the closeout seal 61, such as the lip 64, engages the plunger 66 at an edge or surface of contact. In other embodiments, the closeout seal 61 and the plunger 66 are not in direct contact but, rather, are metered or tightly gapped. In this manner, the closeout seal 61 and the plunger 66 may create a metered gap that discourages air flow around the closeout seal 61 and the plunger 66 and into the interior space 72. In some approaches, the metered gap may be between about 1 and 10 mils, about 1 and 5 mils, and, in some aspects, about 1 and 3 mils. A configuration utilizing a metered gap, as opposed to direct contact, may reduce friction between the closeout seal 61 and the plunger 66 and may also reduce risk of the closeout seal 61 and the plunger 66 binding on one another.

A distal end portion 56 of the flap arm 52 is coupled to a distal end portion 58 of the wall arm 54. The carriage 74 couples the distal end portion 56 of the flap arm 52 to the distal end portion 58 of the wall arm 54. In some embodiments, the flap arm 52, the wall arm 54, and/or the carriage 74 are formed of a monolithic, or unitary, piece of material. A monolithic construction may simplify manufacturing of the first plunger seal 50, for example, by eliminating or reducing the need for riveting or welding.

Figure 7:
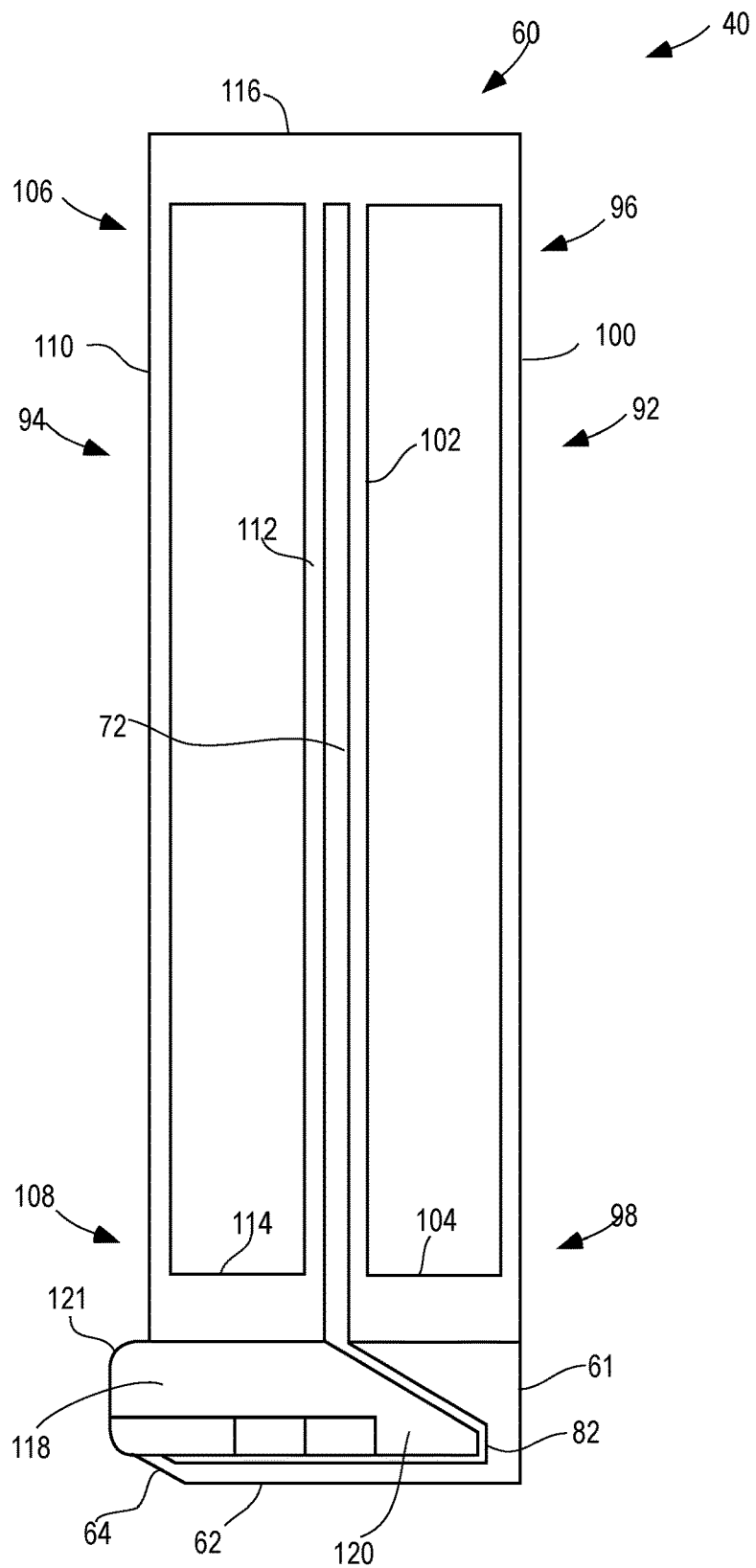
FIG. 7 is a rear, side elevation view of the plunger seal assembly of FIG. 5 with the plunger seals shown in a fully compressed state.

Turning to FIG. 7, the second plunger seal 60 is also coupled to the closeout seal 61 and is shown in a fully compressed state. The closeout seal 61 is a continuous pieced to which the seals 60, 50 are mounted. As shown in this embodiment, seal 60 is identical to seal 50 and explanation of seal 50 applies to seal 60 unless otherwise indicated. The second plunger seal 60 includes the flap arm 92 and the wall arm 94. The wall arm 94 is positioned opposite and spaced from the flap arm 92. The plunger seal 60 defines the interior space 72. The interior space 72 is bounded at least in part by the flap arm 92 and the wall arm 94.

The plunger seal 60 is a linear motion device that employs arms 92, 94 as parallel flexural linkages. The plunger seal 60 includes a base plate 104, a secondary plate 114, and a carriage 116. In the flap arm 92, the carriage 116 is separated a first distance from and secured to the base plate 104 by an outer resilient sheet 100 and an inner resilient sheet 102. The outer resilient sheet 110 and the inner resilient sheet 112 are flexure blades that are in parallel alignment with each other and pivot at their attachment points with the carriage 116. In the wall arm 94, the carriage 116 is separated a second distance from and secured to the secondary plate 114 by an outer resilient sheet 110 and an inner resilient sheet 112. The outer resilient sheet 110 and the inner resilient sheet 112 are flexure blades that are in parallel alignment with each other and pivot at their attachment points with the carriage 116. The flap arm 92 and the wall arm 94 bias outward away from one another to effect rectilinear movement of the plunger 118, which is affixed to the secondary plate 114, in the X-direction (see FIG. 4). The resilient force or outward bias of the arms 92, 94 drives the plunger 118 along the X-direction while minimizing or preventing rotational movements of the plunger 118 about a Y-axis. The plunger seal 60 is sufficiently flexible about the Y-axis to allow the plunger 118 to twist to match the contour of the sidewall 16. The flexibility of the plunger seal 60 about the Y-axis may be further enhanced by shaping or including cut-outs in the sheets 100, 102, 100, 110 (see FIGS. 9 and 10).

In some embodiments, the flap arm 92 and the wall arm 94 are pre-loaded, for example, when under compression as shown in FIG. 7. When pre-loaded, a resilient force urges the flap arm 92 and the wall arm 94 away from one another. When positioned between in a gap, such as a gap between a movable flap and a stationary structure, the resilient force urges the flap arm 92 towards the movable flap, and the wall arm 94 towards the stationary structure to seal the gap. In some embodiments, the second plunger seal 60 may be installed in the gap 42 of the nozzle assembly 10 in FIG. 4. When installed in the gap 42, the second plunger seal 60 exerts a force to urge the flap arm 92 towards the flap 14 and to urge the wall arm 94 towards the sidewall 16 to seal the gap 42. The resilient force biases the flap arm 92 away from the wall arm 94.

The flap arm 92 includes an outer resilient sheet 100 and an inner resilient sheet 102. The inner resilient sheet 102 is opposite and spaced from the outer resilient sheet 100. The outer resilient sheet 100 may be an elongate sheet and, in some embodiments, is generally rectangular in shape. Together, the outer resilient sheet 100 and the inner resilient sheet 102 comprise a parallel flexural arrangement. The inner resilient sheet 102 may also be an elongate sheet and, in some embodiments, is generally rectangular in shape. The outer resilient sheet 100 and the inner resilient sheet 102 may be about the same shape; however, it is also contemplated that the outer resilient sheet 100 and the inner resilient sheet 102 may be different shapes. In some embodiments, the outer resilient sheet 100 is generally parallel with the inner resilient sheet 102. The base plate 104 extends between the outer resilient sheet 100 and the inner resilient sheet 102 at a proximal end portion 98 of the flap arm 92.

The closeout seal 61 is coupled to the flap arm 92 and, in particular, to the proximal end portion 98 of the flap arm 92. In some forms, the closeout seal 61 may be coupled to the base plate 104. In some embodiments, the closeout seal 61 is integral with the second plunger seal 60. That is, the second plunger seal 60 and the closeout seal 61 may be formed of a single, monolithic piece of material. Accordingly, the closeout seal 61 may be integral with the base plate 104. It is also contemplated that the closeout seal 61 may be coupled to the flap arm 92 and/or the base plate 104 via one or more suitable attachment mechanisms, such as via bonding, brazing, welding, nuts and bolts, rivets, etc.

The wall arm 94 includes an outer resilient sheet 110 and an inner resilient sheet 112. The inner resilient sheet 112 is opposite and spaced from the outer resilient sheet 110. The outer resilient sheet 110 may be an elongate sheet and, in some embodiments, is generally rectangular in shape. Together, the outer resilient sheet 110 and the inner resilient sheet 112 comprise a parallel flexural arrangement. The inner resilient sheet 112 may also be an elongate sheet and, in some embodiments, is generally rectangular in shape. The outer resilient sheet 110 and the inner resilient sheet 112 may be about the same shape; however, it is also contemplated that the outer resilient sheet 110 and the inner resilient sheet 112 may be different shapes. In some embodiments, the outer resilient sheet 110 is generally parallel with the inner resilient sheet 112. A secondary plate 114 extends between the outer resilient sheet 110 and the inner resilient sheet 112 at a proximal end portion 108 of the wall arm 94.

A plunger 118 is coupled to the wall arm 94 and, in particular, to the proximal end portion 108 of the wall arm 94. In some forms, the plunger 118 is coupled to the secondary plate 114. In some embodiments, the plunger 118 is integral with the second plunger seal 60. That is, the second plunger seal 60 and the plunger 118 may be formed of a single, monolithic piece of material. Accordingly, the plunger 118 may be integral with the wall arm 94. It is also contemplated that the plunger 118 may be coupled to the wall arm 94 and/or the secondary plate 114 via one or more suitable attachment mechanisms, such as via bonding, brazing, welding, nuts and bolts, rivets, etc.

The plunger 118 has a geometry that generally complements the geometry of the closeout seal 61. In this manner, the closeout seal 61 matingly receives the plunger 118 to seal the interior space 72. The plunger 118 and the closeout seal 61 may take a variety of shapes, for example, for more advantageous wear, pressure or load tailoring. In some embodiments, the plunger has a nose 121 and a tail 120. The nose 121 of the plunger 118 protrudes from the outward-facing side of the plunger 118. When installed in the gap 42, the nose 121 is positioned adjacent the sidewall 16.

The tail 120 of the plunger 118 corresponds to the recess 82 in the closeout seal 61. When in a compressed state, the tail 120 is received by the recess 82 in the closeout seal 61. The tail 120 protrudes from the plunger 118 toward the closeout seal 61 and is proud of the wall arm 94. By protruding into the closeout seal 61, the tail 120 may increase the travel distance of the plunger 118. That is, the tail 120 may permit the plunger 118 to move a greater distance away from and/or towards the closeout seal 61 to accommodate for variations in the size of the gap in which the second plunger seal 60 is disposed.

In operation, the closeout seal 61 receives the plungers 66, 118. In this manner, the seals 50, 60 seal both the gap 42 and the interior space 72 within the seals 50, 60. By sealing the interior space 72, the closeout seal 61 and plungers 66, 118 protect the resilient sheets 51, 53, 55, 57 from exposure to core pressure loads.

Although the recess 82 is shown in the closeout seal 61 and the tail 120 is shown on the plunger 118 in FIGS. 5-12, it is also contemplated that, in other embodiments, the recess 82 could be disposed on the plunger 118 and the tail 120 could be disposed on the closeout seal 61. In some forms, the plunger 118 is proud of the skirt 62 of the closeout seal 61 on a side of the plunger 118 opposite the tail 120. The plunger 118 may also be proud of the wall arm 94 on a side of the plunger 118 opposite the tail 120. In this manner, when the second plunger seal 60 is installed in a gap between a movable flap and stationary structure (e.g., the gap 42 of the nozzle assembly 10 in FIG. 4), the plunger 118, rather than the skirt 62 or the wall arm 94, contacts the stationary structure to seal the gap.

The resilient sheets 100, 102, 110, 112 resist deformations in the sidewall 16. The resilient sheets 100, 102, 110, 112 may also confine the plunger 118 to operate in the same general horizontal plane as the closeout seal 61. In operation, the resilient sheets 100, 102, 110, 112 flex when the sidewall 16 deforms while still movement of the plunger 118 in the same general plane as the closeout seal 61. In this manner, the plunger 118 moves generally horizontally into and out of the closeout seal 61 to seal the interior space 72 of the plunger seal assembly 40.

In some embodiments, it is contemplated that one or more portions of the closeout seal 61, such as the lip 64, engage the plunger 118 at an edge or surface of contact. In other embodiments, the closeout seal 61 and the plunger 118 are not in direct contact but, rather, are metered or tightly gapped. In this manner, the closeout seal 61 and the plunger 118 create a metered gap that discourages air flow around the closeout seal 61 and the plunger 118 and into the interior space 72. In some approaches, the metered gap may be between about 1 and 10 mils, about 1 and 5 mils, and, in some aspects, about 1 and 3 mils. A configuration utilizing a metered gap, as opposed to direct contact, may reduce friction between the closeout seal 61 and the plunger 118 and may also reduce risk of the closeout seal 61 binding the plunger 118.

A distal end portion 96 of the flap arm 92 is coupled to a distal end portion 106 of the wall arm 94. In some embodiments, a carriage 116 couples the distal end portion 96 of the flap arm 92 to the distal end portion 106 of the wall arm 94. In some forms, the flap arm 92 may be positioned at an angle of about 75 degrees to about 90 degrees relative to the carriage 116 when the second plunger seal 60 is in a fully compressed state, for example, as depicted in FIG. 7. Similarly, in some forms, the wall arm 94 may be positioned at an angle of about 75 degrees to about 90 degrees relative to the carriage 116 when the second plunger seal 60 is in a fully compressed state. The flap arm 92 and the wall arm 94 may form a hairpin-shape. In some embodiments, the flap arm 92, the wall arm 94, and/or the carriage 116 are formed of a monolithic, or unitary, piece of material. A monolithic construction may simplify manufacturing of the second plunger seal 60, for example, by eliminating or reducing the need for riveting or welding.

When installed in the gap 42, the flap arm 52 of the first plunger seal 50 is positioned adjacent the flap 14 (e.g., the movable flap), and the wall arm 54 is positioned adjacent the sidewall 16 (e.g., the stationary structure). However, in some embodiments, the orientation of the flap arm 52 and the wall arm 54 may be reversed. Also, when installed in the gap 42, the flap arm 92 of the second plunger seal 60 is positioned adjacent the flap 14 (e.g., the movable flap), and the wall arm 94 is positioned adjacent the sidewall 16 (e.g., the stationary structure). However, in some embodiments, the orientation of the flap arm 92 and the wall arm 94 may be reversed.

Figure 8:
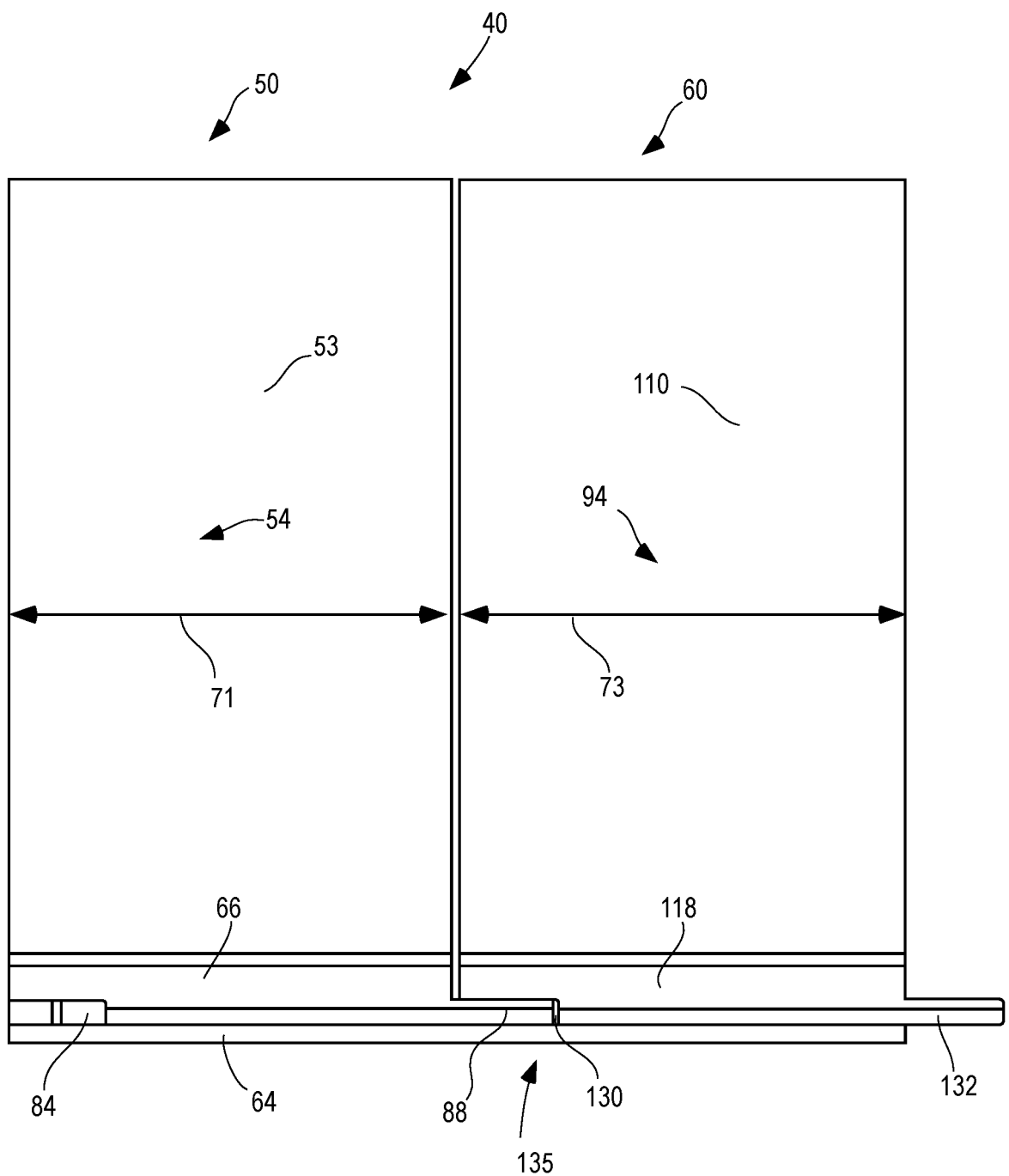
FIG. 8 is a right, side elevation view of the plunger seal assembly of FIG. 5 with the plunger seals shown in a fully compressed state.

With reference to FIG. 8, the first plunger seal 50 and the second plunger seal 60 are in a fully compressed state. With respect to the first plunger seal 50, the wall arm 54 is an elongate sheet and, in some embodiments, is generally rectangular in shape. While not shown in FIG. 8, the flap arm 52 may be generally the same shape as the wall arm 54. However, it is also contemplated that the flap arm 52 and wall arm 54 may have different shapes or different widths 71 when viewed from the side. The lip 64 of the closeout seal 61 extends below the plunger 66 of the first plunger seal 50. The width 71 of the wall arm 54 and the flap arm 52 (not shown in FIG. 8) may vary depending on the amount of fluctuation needed to accommodate the changing profile of the sealing surfaces.

For example, the first plunger seal 50 may have a wider width 71 in an application where the sealing surfaces are subject to fewer fluctuations. The first plunger seal 50 may have a narrower width 71 in an application where the sealing surfaces are subject to more fluctuations. Similar, in an application where the sidewall 16 or other sealing surface has a large amount of curvature, for example due to distortions from thermal or pressure rippling, narrower plunger seals 50 may reduce the amount of leakage through the gap 42.

With respect to the second plunger seal 60, the wall arm 94 is an elongate sheet and, in some embodiments, is generally rectangular in shape. While not shown in FIG. 8, the flap arm 92 may be generally the same shape as the wall arm 94. However, it is also contemplated that the flap arm 92 and the wall arm 94 may have different shapes or different widths 73 when viewed from the side. The lip 64 of the closeout seal 61 extends below the plunger 118 of the second plunger seal 60. The width 73 of the wall arm 94 and the flap arm 92 (not shown in FIG. 8) may vary depending on the amount of fluctuation needed to accommodate the changing profile of the sealing surfaces.

A structure having more deformations or variations in gap size may employ more seals 50, 60 having a shorter width 71, 73. Employing more seals 50, 60 having a shorter width 71, 73 may enable the wall arm 54, 94 of the seals 50, 60 to conform more closely to a changing profile or shape of the structure and the gap. A structure having fewer deformations or variations in gap size may employ fewer seals 50, 60 having a longer width 71, 73.

The first plunger seal 50 is coupled to the second plunger seal 60 via a lap joint 135. More specifically, the plunger 66 of the first plunger seal 50 is coupled to the plunger 118 of the second plunger seal 60 via the lap joint 135. So configured, the plunger 66 and the plunger 118 are co-planar such that each plunger 66, 118 move horizontally into and out of the closeout seal 61 independently of one another. In some approaches, the lap joint 135 may be a shiplap joint. At the lap joint 135, an extension 132 from the plunger 66 is received by a notch 130 in the plunger 118. The plunger 66 of the first plunger seal 50 also includes a notch 84 and the plunger 118 of the second plunger seal 60 also includes an extension 132. In this manner, an additional plunger seal may be coupled to either end of the seal assembly 40. It is contemplated that the lap joint 135 seals the interior space 72 bounded by the first plunger seal 50 and the second plunger seal 60 (not shown in FIG. 8, see FIGS. 5-7). Although a lap joint is depicted in FIG. 8, any suitable joint, such as finger joints, butt joints, or shiplap joints, may be used to mate the plunger of one plunger seal to another plunger seal. While only two seals 50, 60 are coupled together in FIG. 8, it is contemplated that any number of such seals may be coupled together along the closeout seal 61.

While only two plunger seals are depicted in FIG. 8, it is contemplated that a plurality of plunger seals may be coupled together along a length (i.e., from a fore to an aft end) of a movable flap, such as the flap 14 in nozzle assembly 10 of FIG. 1. One or more plunger seals may by directly coupled together or may be positioned adjacent each other along the length of the flap 14. In some approaches, plunger seals having narrower widths may be employed to allow the plurality of plunger seals to more closely conform to the shape of the structure against which the plunger seals are positioned. In some embodiments, when more than one plunger seal is coupled to the closeout seal 61, the plunger seals are positioned so that the plungers are in a co-planar arrangement.

Figure 9:
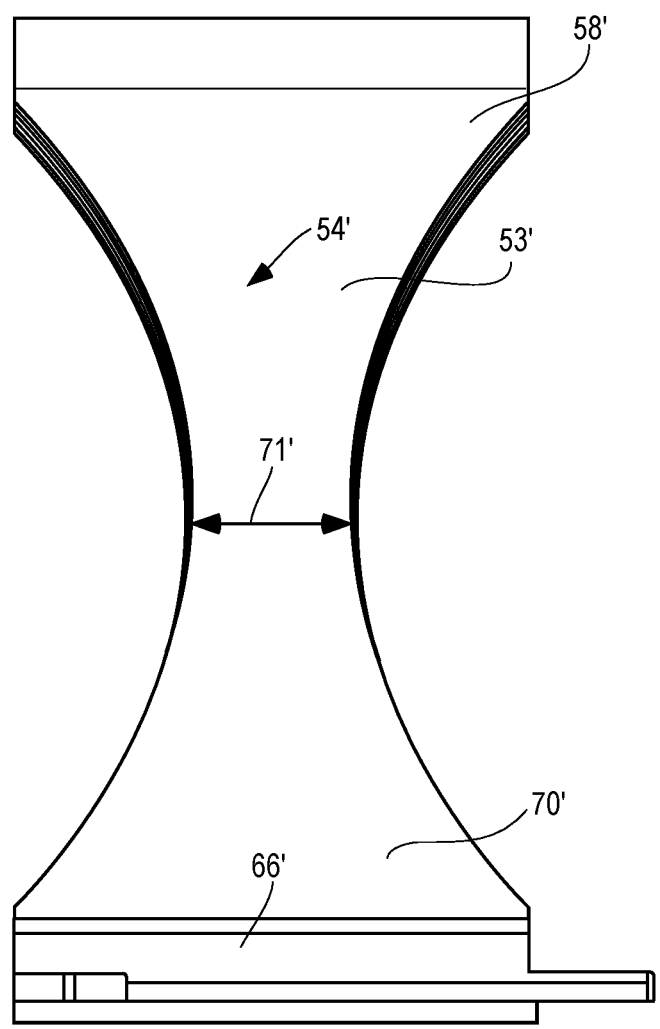
FIG. 9 is a right, side elevation view of another embodiment of a plunger seal assembly.

Turning to FIG. 9, a plunger seal 50' is illustrated where the wall arm 54' is a shaped sheet. While not shown in FIG. 9, the corresponding flap arm 52' may be generally the same shape as the wall arm 54'. In this embodiment, the wall arm 54' is an hourglass shape. The distal end portion 58' and the proximal end portion 70' are wider than the intermediate portion 53' of the wall arm 54'. Due to differences in shape, the arms 54, 54' in FIGS. 8 and 9 differ flexurally. The shape of the sheets impacts the compliance of the arms. The shaped wall arm 54' in FIG. 9, for example, is more compliant and free to twist than the wall arm 54 in FIG. 8.

Figure 10:
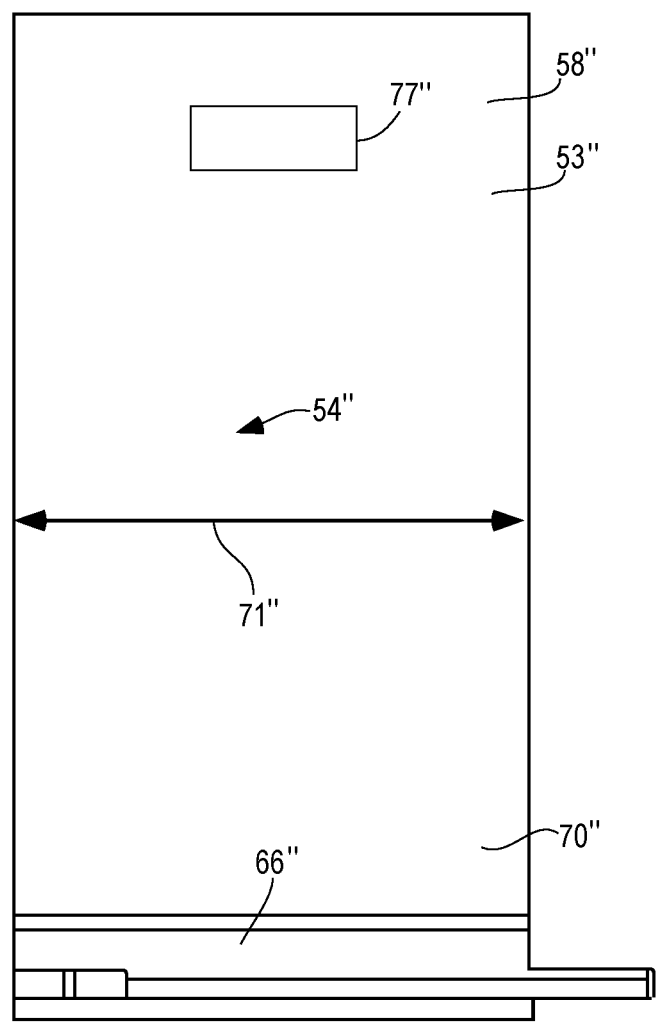
FIG. 10 is a right, side elevation view of another embodiment of a plunger seal assembly.

Turning to FIG. 10, a plunger seal 50" is illustrated where the wall arm 54" includes a notch or cut-out 77". Due to differences in shape, the arms 54, 54" in FIGS. 8 and 10 differ flexurally. Including one or more cut-outs 77" makes the arm 54" in FIG. 10 more compliant than the arm 54 in FIG. 8 and increases its freedom of motion as a flexure. The cut-out 77" also changes the stresses and reduce the force exerted by the arm 54" as compared to arm 54 when under compression.

Figure 11:
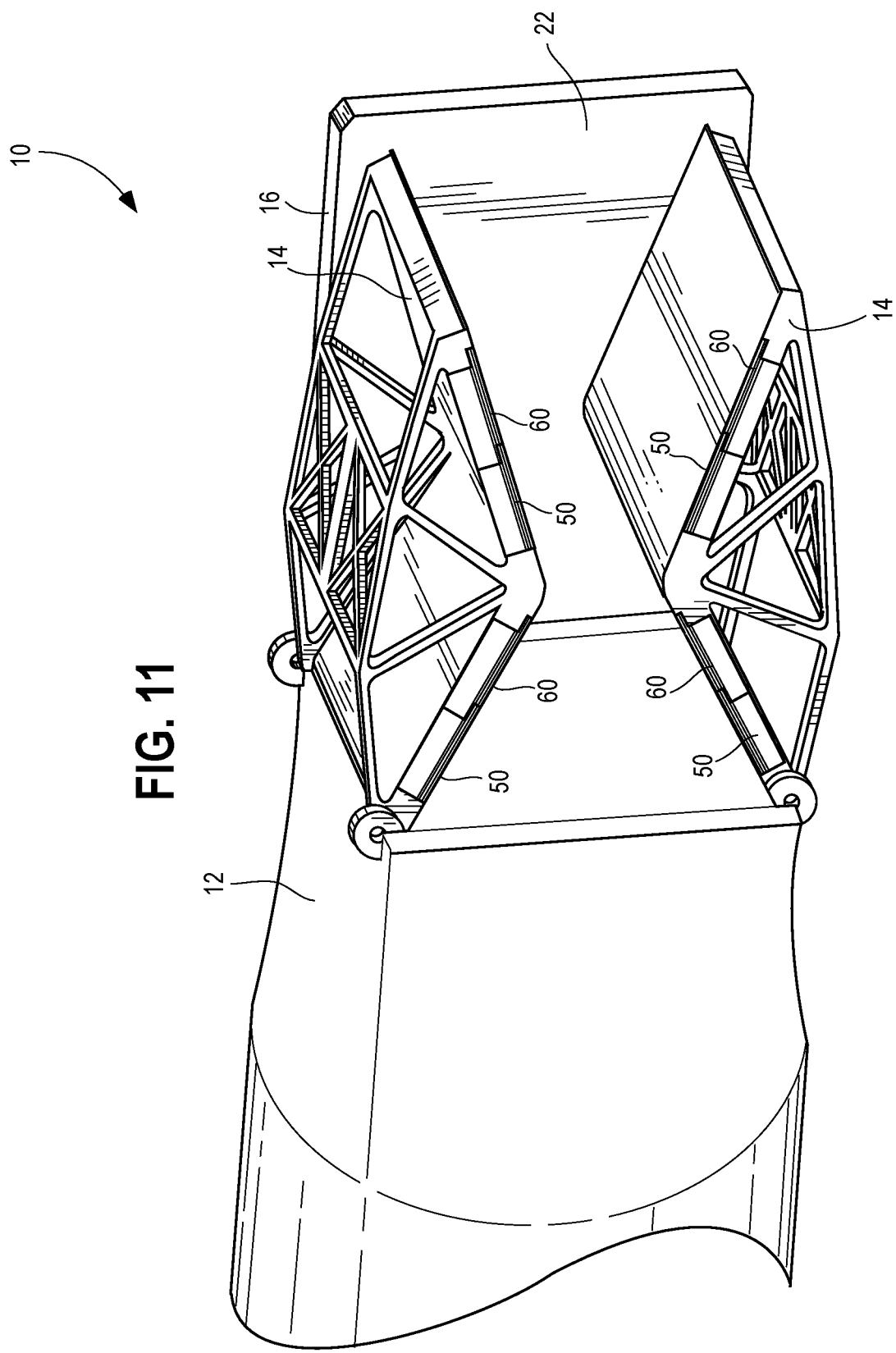
FIG. 11 is a perspective view of a series of the plunger seals of FIG. 5 installed in the nozzle assembly of FIG. 1.

Illustrated in FIG. 11 is an exemplary installation of a series of plunger seals 50, 60. The series of seals 50, 60 is installed on the flap 14 of the nozzle assembly 10 depicted in FIG. 1. The seals 50, 60 are butted or precisely spaced along the edge of the flap 14. It is also contemplated that the seals may be joined to one another using lapped joints or other labyrinthine features. Such lapped joints or labyrinthine features may be employed to discourage core air from bypassing the seals 50, 60. As shown, the series of seals is installed linearly along the edge of the flap 14. No seals 50, 60 are installed on the curved elbow of the flap 14. In some embodiments, two separate series of seals 50, 60 may be joined by a separate transition seal at the curved elbow of the flap 14. Such transitions seals may be labyrinthine or intermediate seals to transition one linearly installed series of seals 50, 60 to another linearly installed series of seals 50, 60.

In FIGS. 5-11, the first plunger seal 50 and the second plunger seal 60 are shown moving in conjunction with one another. That is, the plunger 66 and the wall arm 54 of the first plunger seal 50 and the plunger 118 and the wall arm 94 of plunger seal 60 are shown in alignment in FIGS. 5-11. However, it is contemplated that the plunger 66 and the wall arm 54 of the first plunger seal 50 and the plunger 118 and the wall arm 94 of the second plunger seal 60 may move independently of one another. For example, if an external force is applied to only one of the plunger 66 and the plunger 118, only the plunger subjected to the external force will move towards the closeout seal 61. Accordingly, one of the first plunger seal 50 and the second plunger seal 60 may be compressed to a greater degree than the other. In this manner, each plunger seal 50, 60 may react and respond to external forces independently of each other. When a plurality of the plunger seals described herein are positioned in a gap, the plunger seals may accommodate variations in the size of the gap. For example, when positioned in the gap 42 between the flap 14 and the sidewall 16, the plunger seals may accommodate differences in the size of the gap 42 along the length of the flap 14.

Figure 12:
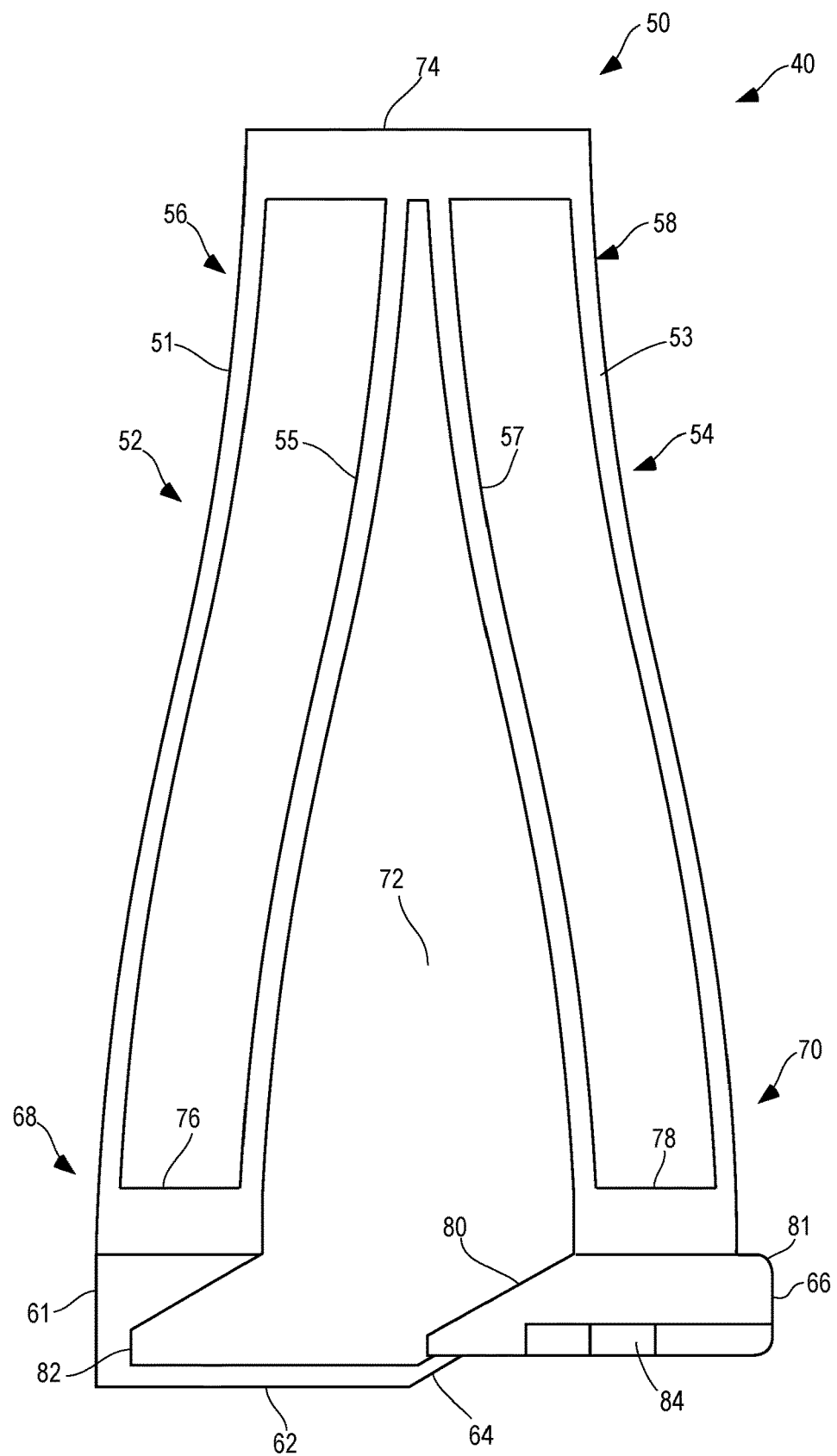
FIG. 12 is a front, side elevation view of the plunger seal assembly of FIG. 5 with the plunger seals shown in a further expanded state.

As discussed above, FIGS. 5-8 illustrate the plunger seal assembly 40 with the first plunger seal 50 in a fully compressed state. The first plunger seal 50 may be in a fully compressed state, for example, when the plunger seal assembly 40 is positioned in a gap (e.g., the gap 42) between a movable flap (e.g., the flap 14) and a stationary structure (e.g., the sidewall 16). For example, when positioned in such the gap 42, this fully compressed state may be achieved when the sidewall 16 or a portion thereof shifts towards the flap 14, decreasing the size of the gap 42 between the flap 14 and the sidewall 16. Decreasing the size of the gap 42 compresses the first plunger seal 50 and the second plunger seal 60. When in a fully compressed state, the tail 80 of the plunger 66 is in contact with, or fully received by, the recess 82 of the closeout seal 61. Similarly, the tail 120 of the plunger 118 on the second plunger seal 60 is in contact with, or fully received by, the recess 82 of the closeout seal 61. With reference to FIG. 12, the first plunger seal 50 and the second plunger seal 60 are in a further expanded state. Although in further expanded, the first plunger seal 50 and the plunger seal 60 are still under compression relative to the free state. The skirt 62 of the closeout seal 61 and the plungers 66, 118 are still lapped and preventing core air from bypassing into the interior space 72. It is contemplated that, in some approaches, the skirt 62 and the plungers 66, 118 may be lapped when the plunger seals 50, 60 are in their free state. For example, when the plunger seals 50, 60 include an actuation mechanism 79 (see FIG. 15), the actuation mechanism 79 drives the actuation of the plungers 66, 118.

The plunger seal assembly 40 may be in the further expanded state as shown in FIG. 10, for example, when the plunger seal assembly 40 is positioned in a gap (e.g., the gap 42) between a movable flap (e.g., the flap 14) and a stationary structure (e.g., the sidewall 16). For example, when positioned in the gap 42, the sidewall 16 or a portion thereof may shift away from the flap 14, increasing the size of the gap 42 between the flap 14 and the sidewall 16. Increasing the size of the gap 42 de-compresses the first plunger seal 50 and the second plunger seal 60 (not shown in FIG. 10). In this state, the sidewall 16 will be in contact with the wall arm 54. In some embodiments, the plunger 66 of the wall arm 54 is in contact with the sidewall 16 when the first plunger seal 50 is in the further expanded state.

In some approaches, the plunger seal assembly 40 may be sized to maintain overlap between the closeout seal 61 and the plunger 66 when the first plunger seal 50 is in the further expanded state. That is, the plunger seal assembly 40 may be sized so that, at a maximum gap size, the tail 80 does not extend beyond the skirt 62 and/or the lip 64 of the closeout seal 61. In this manner, the plunger 66 and the closeout seal 61 may be capable of sealing the interior space 72 when the first plunger seal 50 is further expanded.

Figure 13:
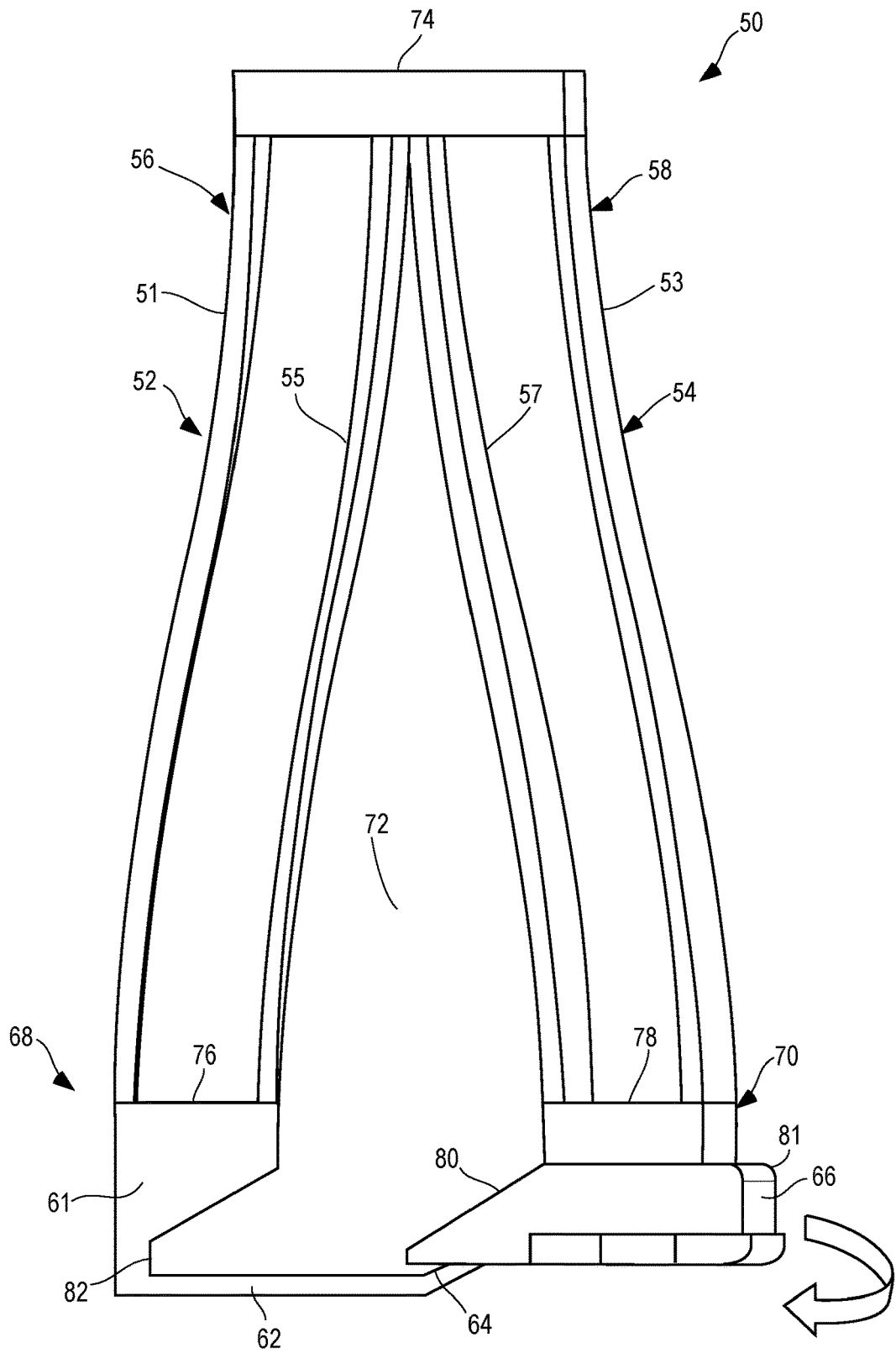
FIG. 13 is a front, side elevation view of the plunger seal assembly of FIG. 5 with the plunger seals shown in the further expanded state, depicting the seals under torsion.
Figure 14:
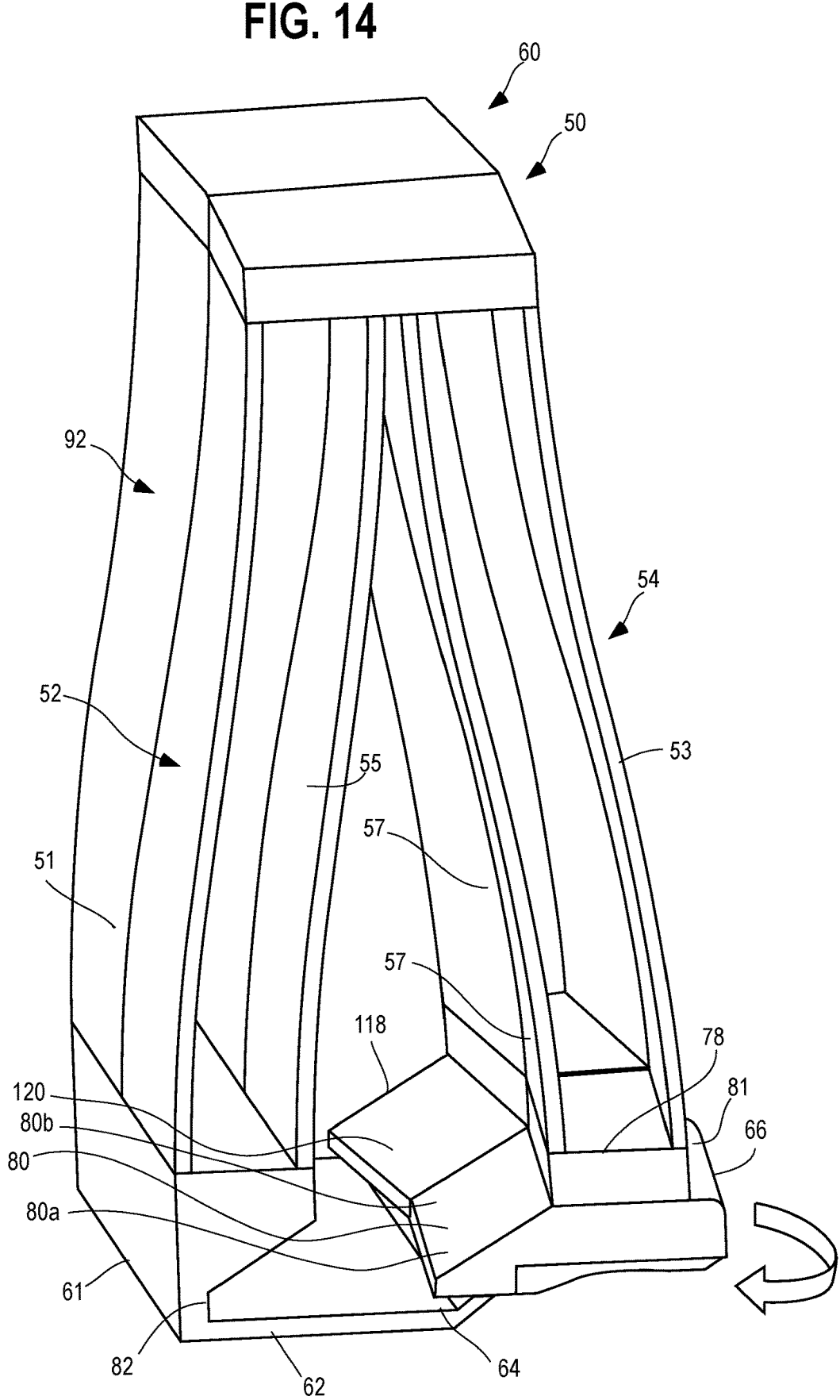
FIG. 14 is a front, perspective view of the plunger seal assembly of FIG. 5 with the plunger seals shown in the further expanded state, depicting the seals under torsion.

With reference to FIGS. 13 and 14, the first plunger seal 50 and second plunger seal 60 are subjected to torsion in the further expanded state. The wall arm 54 is able to twist, for example, to accommodate a distortion in a stationary structure (e.g., the sidewall 16) adjacent the wall arm 54. Distortions in the sidewall 16 impact the size of the gap 42 and, in some instances, subject the plunger 66 and the plunger 118 to torsion. When subjected to torsion, the wall arm 54 twists to set the plunger 66 against the sidewall 16. By setting the plunger 66 against the sidewall 16, the first plunger seal 50 and the second plunger seal 60 automatically seal the gap 42. As shown, the wall arm 54 is twisting in response to a distortion in the sidewall 16. The first plunger seal 50 is twisting to move the outward portion 80*a* of the tail 80 of the plunger 66 toward the closeout seal 61 and to move the inward portion 80*b* of the tail 80 of the plunger 66 away from the closeout seal 61. With this plunger movement, the wall arm 54 and the flap arm 52 twist about the closeout seal 61, which is fixed to flap 14. The depth of the recess 82 of the closeout seal 61 allows for the plunger to move and to accommodate twisting while maintaining a seal.

Further, the resilient sheets (i.e., the outer resilient sheet 51, the inner resilient sheet 55, the outer resilient sheet 53, and the inner resilient sheet 57) maintain the plunger (e.g., the plunger 66) predominantly in the same plane when the first plunger seal 50 is subjected to torsion from external forces. In this manner, the inclusion of the resilient sheets (i.e., the outer resilient sheet 51, the inner resilient sheet 55, the outer resilient sheet 53, and the inner resilient sheet 57) helps to seal the interior space 72 when the first plunger seal assembly 50 is subjected to external forces, such as torsional forces. An external force may be applied to the first plunger seal 50, for example, via distortion or shifting of the sidewall 16 adjacent to the first plunger seal 50. The inclusion of the resilient sheets may also maintain the plunger spacing and prevent the plunger 66 of the first plunger seal 50 from binding or sticking to the plunger of an adjacent plunger seal.

When pressure or a torsional force is exerted on plunger 66, the resilient sheet 51, 53, 55, 57 prevent or reduce rotation and generally maintain linear motion of the plunger in the X-direction (see FIG. 4). Adjusting the relative taper and thickness of the resilient sheets 51, 53, 55, 57 may increase or reduce the bias of the arms' 52, 54 resistance to rotation. The resilient sheets 51, 53, 55, 57 restrain the plunger 66 to a path of movement that is defined, at least in part, by the relationship between the arms 52, 54 as defined by the base plate 76, the secondary plate 78, and the carriage 74. This flexural relationship defines the path of movement of the plunger 66 relative to the base plate 76. Adjusting the position of the resilient sheets 51, 53, 55, 57 relative to one another changes the path of movement of the plunger 66. By defining the plunger's 66 path of movement, the resilient sheets 51, 53, 55, 57 of the arms 52, 54 maintain the seal between the closeout seal 61 and the plunger 66 when the plunger 66 is subjected to pressure or external forces.

In some embodiments, the plunger seal assemblies described herein may be equipped with integral cooling and/or heating. Such integral cooling and/or heating may help to maintain isothermal operation of the seal assemblies or to thermally regulate the seal assemblies. In some approaches, the plunger seals (e.g., the first plunger seal 50 and the second plunger seal 60) may include one or more resilient sheets that are hollowed or include passages therein to accommodate fluid flow. For example, one or more of the outer resilient sheet 51, the inner resilient sheet 55, the outer resilient sheet 53, and the inner resilient sheet 57 of the first plunger seal 50 may include a plenum. Similarly, in another example, one or more of the resilient sheets 100, 102, 110, and 112 of the second plunger seal 60 may include a plenum.

Figure 15:
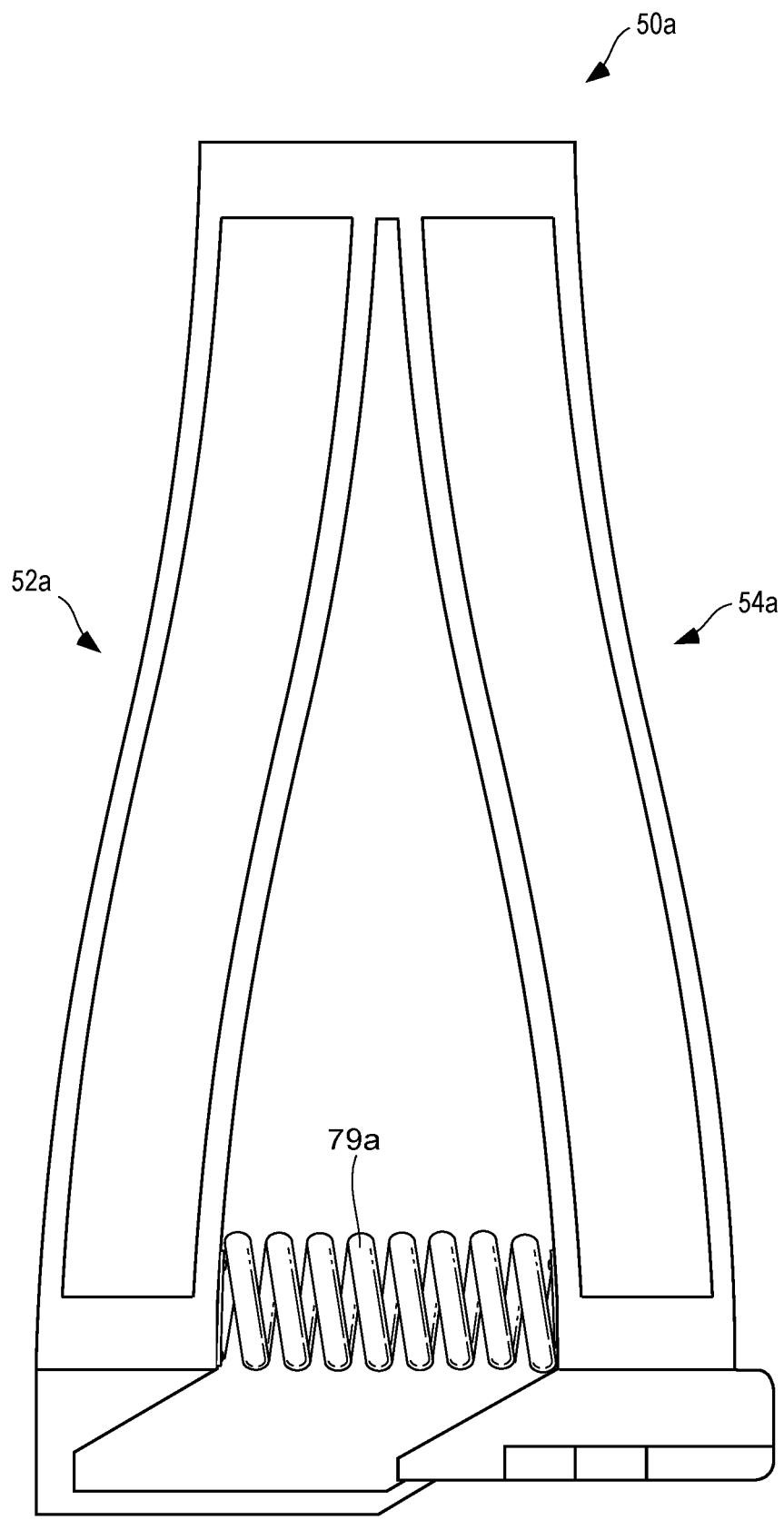
FIG. 15 is a front, side elevation view of another embodiment of a plunger seal assembly.

Turning to FIG. 15, an alternative embodiment of the plunger seal 50*a* includes an actuation mechanism 79*a*. In The actuation mechanism 79*a*, for example, may be a spring or a plunger assembly. The actuation mechanism 79*a* creates a force to drive the motion of the flap arm 52*a* and the wall arm 54*a* away from one another. In this embodiment, the arms 52*a*, 54*a* are not bias outwardly via a resilient force, but instead, are driven away from one another by the actuation mechanism 79*a*. In this manner, the arms 52*a*, 54*a* are not pre-loaded when under compression but are straight and adjacent to each other when the seal 50*a* is in its free state.

Figure 16:
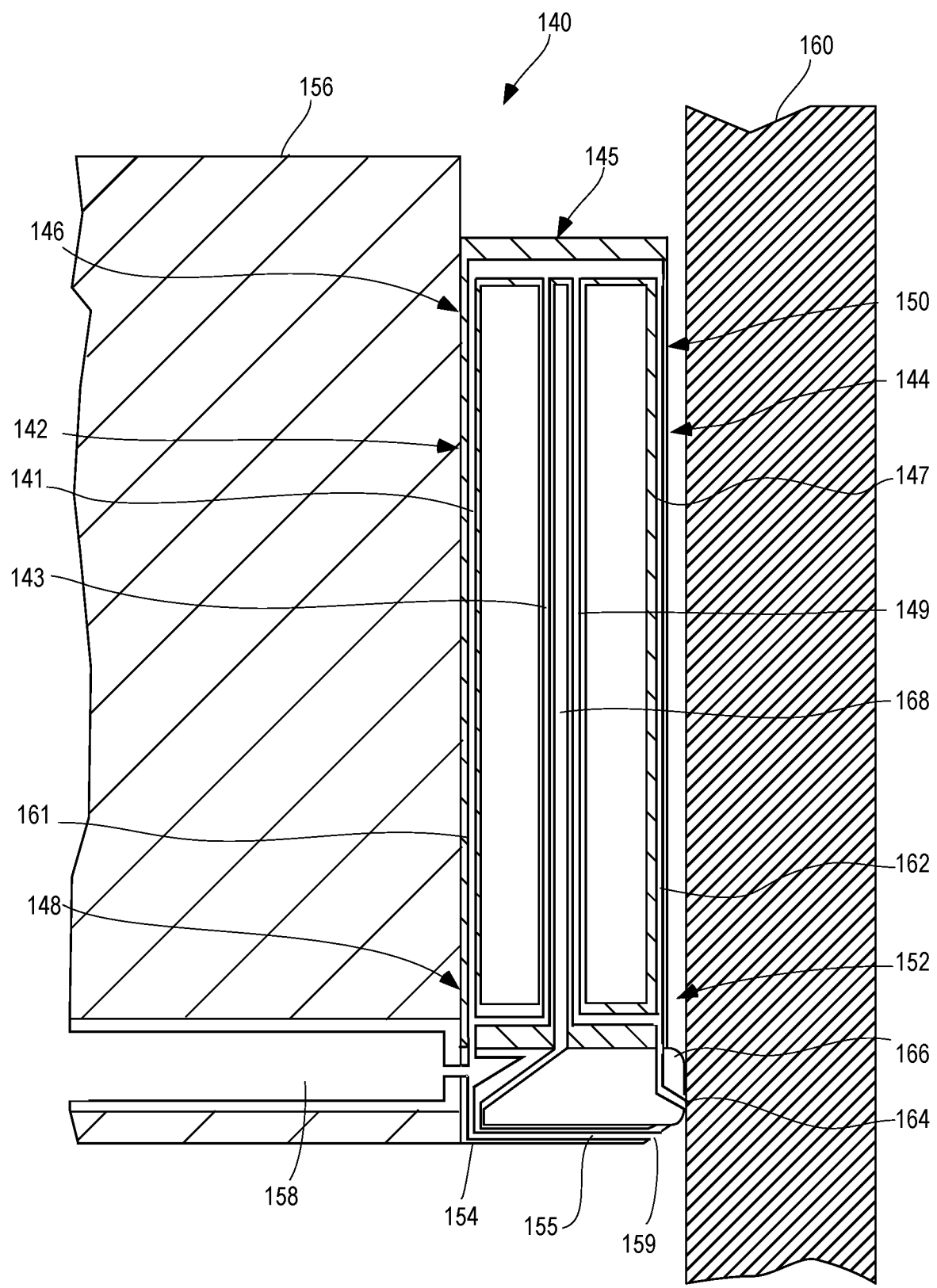
FIG. 16 is a cross-sectional view of an exemplary plunger seal assembly equipped with integral heating and/or cooling, in accordance with some embodiments.

With reference to FIG. 16, an exemplary plunger seal assembly 140 is equipped with integral fluid flow for thermal management, in accordance with some embodiments. Integral fluid flow may provide heating and/or cooling to the plunger seal assembly 140. In some embodiments, the fluid flow in the plunger seal assembly 140 is supplied from and/or returned to an aircraft. It is contemplated that integral fluid flow may be supplied and/or returned via one or more passages, channels, tubes, slots, and shaped orifices in the plunger seal assembly 140 or portions thereof. In addition to thermal management, fluid flow may be used to protect, purge, shield, or buffer the plunger seal assembly 140 from ambient or core airflow around the plunger seal assembly 140. For example, fluid flow may be directed around to provide a film seal (e.g., a thin film of fluid flow to provide a boundary layer) or a purge flow to protect the plunger seal assembly 140. In this manner, the fluid flow may be employed to protect the plunger seal assembly 140 or portions thereof or to enhance nozzle performance.

The plunger seal assembly 140 is installed on a movable flap 156, in a gap between the movable flap 156 and a stationary structure 160. In some embodiments, the movable flap 156 is a flap of a gas turbine engine nozzle assembly, such as flap 14 of the nozzle assembly 10 depicted in FIGS. 1-4. The plunger seal assembly 140 includes a closeout seal 154 and a plunger seal 145.

The closeout seal 154 has a geometry complementing the shape of the plunger 166 on the plunger seal 145. The closeout seal 154 may be mounted to the moveable flap 156, for example, via nuts and bolts, rivets, welding, or bonding. The moveable flap 156 includes a channel 158 through which a fluid, such as air or other gases, may flow. In some embodiments, the closeout seal 154 is integral with the moveable flap 156. The closeout seal 154 includes an interior cavity 155. The interior cavity 155 of the closeout seal 154 is in fluid communication with the channel 158 of the moveable flap 156. In this manner, the closeout seal 154 may receive a flow of a fluid, such as a cooling and/or heating fluid, from the channel 158. The closeout seal 154 further includes an outlet opening 159. The outlet opening 159 is fluid communication with the interior cavity 155 and the environment surrounding the plunger seal assembly 140.

In some embodiments, when the plunger seal assembly 140 is installed in a gap within a gas turbine engine nozzle assembly, such as gap 42 of the nozzle assembly 10 depicted in FIG. 4, the outlet opening 159 directs fluid flow out of the closeout seal 154 from the interior cavity 155 and into the nozzle core. Accordingly, the outlet opening 159 is in fluid communication with core air within the nozzle assembly. Although core air is pressurized, the flow of cooling and/or heating fluid out of outlet opening 159 may prevent the backflow of core air into the interior cavity 155 of the closeout seal 154. Further, the flow of fluid out of outlet opening 159 may create a film seal below the plunger 166. Such a film seal below the plunger 166 may help to prevent the flow of core air from the nozzle core into an interior space 168 with the plunger seal.

The plunger seal 145 includes a flap arm 142 and a wall arm 144. A distal end portion 146 of the flap arm 142 is coupled to a distal end portion 150 of the wall arm 144. A proximal end portion 148 of the flap arm 142 is coupled to the closeout seal 154. A proximal end portion 152 of the wall arm 144 is coupled to a plunger 166. The plunger 166 and the closeout seal 154 have corresponding geometries, in accordance with the plunger seals described with reference to FIGS. 5-11.

The flap arm 142 includes an outer resilient sheet 141 and an inner resilient sheet 143. A first plenum 161 is disposed within the flap arm 142. The first plenum 161 may be disposed within one or more of the outer resilient sheet 141 and the inner resilient sheet 143. The wall arm 144 includes an outer resilient sheet 147 and an inner resilient sheet 149. A second plenum 162 is disposed within the wall arm 144. The second plenum 162 may be disposed within one or more of the outer resilient sheet 147 and the inner resilient sheet 149.

The first plenum 161 is in fluid communication with the interior cavity 155 of the closeout seal 154. The first plenum 161 is also in fluid communication with the second plenum 162. In this manner, a heating and/or cooling fluid, such as air, may flow from the interior cavity 155 of the closeout seal 154 through the first plenum 161 and into the second plenum 162. In some embodiments, the second plenum 162 is also in fluid communication with an outlet opening 164 disposed on the plunger 166. The outlet opening 164 is in fluid communication with the environment surrounding the plunger seal assembly 140. In this manner, the flow of cooling and/or heating fluid may exit the second plenum 162 through the second outlet opening 164. By including the second plenum 162 and the outlet opening 164 in the plunger 166, heating and/or cooling air is able to reach portion of the plunger seal that may, otherwise, be difficult to reach.

In some embodiments, when the plunger seal assembly 140 is installed in a gap, such as the gap 42 of the nozzle assembly 10, the outlet opening 159 directs fluid flow out of the closeout seal 154 from the interior cavity 155 and into the nozzle core. Accordingly, the outlet opening 164 is in fluid communication with core air within the nozzle assembly 10. Although core air is pressurized, the flow of cooling and/or heating fluid from outlet opening 164 may prevent the backflow of core air into the second plenum 162. Further, the flow of fluid out of the outlet opening 164 may create a film seal below the plunger 166. Such a film seal below the plunger 166 may help to prevent the flow of core air from the nozzle core into an interior space 168 of the plunger seal 145.

It is contemplated that, in some embodiments, the integrally cooled plunger seal assembly 140 is installed in a nozzle flap of a gas turbine engine. In such an installation, heating and/or cooling air may be supplied through the channel 158 in the moveable flap 156 via an upstream fan of the gas turbine engine. Not wishing to be bound by theory, using the gas turbine engine fan to supply heating and/or cooling air may help to maintain isothermal operation or to thermally regulate the plunger seal assembly 140.

The plunger seal assemblies described herein (e.g., the plunger seal assembly 40, the plunger seal assembly 140) may be made of any suitable metallic or ceramic material. Materials used to in the plunger seal assembly may be selected to withstand the temperatures of hot engine core air that may be in contact with the plunger seal assembly, for example, when the plunger seal assemblies are employed in a gas turbine engine nozzle assembly such as the nozzle assembly 10 depicted in FIG. 1. It is also contemplated that, in some embodiments, when the plunger seal assemblies are employed in a high temperature environment such as a gas turbine engine nozzle assembly, the plunger seal assemblies, or portions thereof such as exterior or core-exposed surfaces, may not include viscoelastic materials such as rubber or polymers, as such materials may not be capable of withstanding high temperatures. The plunger seal assemblies or portions thereof may also include coatings to enhance tribological, thermal, corrosion capability, wear resistance, or other seal performance or durability properties.

Further aspects of the invention are provided by the subject matter of the following clauses:

A seal apparatus comprising: a first seal having a first proximal end portion and a first distal end portion; a second seal having a second proximal end portion and a second distal end portion, the second distal end portion coupled to the first distal end portion, and the second seal opposite the first seal and defining an interior space therebetween; a closeout seal attached to the first proximal end portion of the first seal; and a plunger attached to the second proximal end portion of the second seal, and the plunger having a geometry corresponding to a geometry of the closeout seal, wherein the plunger is matingly received by the closeout seal to seal the interior space, and the first seal biases away from the second seal.

The apparatus of any preceding clause wherein the first seal comprises a first resilient sheet, a second resilient sheet parallel to the first resilient sheet, and a base plate extending between the first resilient sheet and the second resilient sheet at the first proximal end portion of the first seal, and the closeout seal is attached to the base plate The apparatus of any preceding clause wherein the second seal comprises a third resilient sheet, a fourth resilient sheet parallel to the third resilient sheet, and a secondary plate extending between the third resilient sheet and the fourth resilient sheet at the second proximal end portion of the second seal, and the plunger is attached to the secondary plate The apparatus of any preceding clause wherein the first seal and the second seal are flexurally related by the first resilient sheet, the second resilient sheet, the third resilient sheet, and the fourth resilient sheet such that the plunger has a predetermined movement The apparatus of any preceding clause wherein the first seal and the second seal are a single piece of material.

The apparatus of any preceding clause wherein the closeout seal defines a recess that receives the plunger.

The apparatus of any preceding clause wherein the plunger comprises a projection having a geometry corresponding to a geometry of the recess.

The apparatus of any preceding clause wherein the plunger is configured to move predominately linearly into and out of the recess in the closeout seal.

The apparatus of any preceding clause wherein the closeout seal is rigidly integrated into a moveable flap.

The apparatus of any preceding clause wherein the closeout seal comprises a lip that engages the plunger when the plunger is received by the closeout seal.

The apparatus of any preceding clause wherein the closeout seal is operably coupled to a second seal apparatus, the second seal apparatus comprising: a third seal having a third proximal end portion and a third distal end portion; a fourth seal having a fourth proximal end portion and a fourth distal end portion coupled to the third distal end portion of the third seal, the fourth seal opposite the third seal and defining a second interior space therebetween; a second plunger attached to the second proximal end portion of the second seal and coupled to the first plunger via a lap joint, the second plunger having a geometry generally corresponding to the geometry of the closeout seal; and wherein the second plunger is matingly received by the closeout seal to seal the second interior space, and the third seal biases away from the fourth seal.

A seal assembly comprising: a first seal having a first proximal end portion and a first distal end portion and defining a first plenum; a second seal opposite the first seal, the second seal having a second proximal end portion, and a second distal end portion coupled to the first distal end portion of the first seal and defining a second plenum in fluid communication with the first plenum; a closeout seal attached to the first proximal end portion of the first seal and defining an interior cavity in fluid communication with the first plenum; and a plunger attached to the second proximal end portion of the second seal, wherein the plunger is matingly received by the closeout seal, and wherein the interior cavity of the closeout seal is configured to receive a supply of fluid to thermally regulate the seal assembly to seal a gap between a moveable flap and a stationary structure.

The assembly of any preceding clause wherein the moveable flap defines a channel, the supply of fluid is provided by a flow of air supplied from the channel, and the channel is in fluid communication with the interior cavity of the closeout seal.

The assembly of any preceding clause wherein the closeout seal defines a first outlet opening in fluid communication with an environment surrounding the seal assembly and in fluid communication with the interior cavity.

The assembly of any preceding clause wherein the plunger defines a second outlet opening in fluid communication with the environment surrounding the seal assembly and in fluid communication with the second plenum.

The assembly of any preceding clause wherein the supply of fluid exits the second outlet opening to create a film seal below the plunger.

A method of sealing a dynamic gap using a first seal apparatus, the first seal apparatus comprising: a first seal having a first proximal end portion and a first distal end portion; a second seal having a second proximal end portion and a second distal end portion coupled to the first distal end portion of the first seal, the second seal opposite the first seal and forming an interior space therebetween; a closeout seal attached to the first proximal end portion of the first seal; and a first plunger attached to the second proximal end portion of the second seal, wherein the first plunger is matingly received by a recess in the closeout seal to seal the interior space, and wherein the first seal biases away from the second seal to seal the dynamic gap, the method comprising the steps of: contacting at least one surface defining the dynamic gap with the plunger; and moving at least the first plunger automatically relative to the recess in response to movement in the at least one surface.

The method of any preceding clause wherein the moving further comprises moving the first plunger predominantly linearly in and out of the closeout seal in response to movement in the at least one surface to seal the gap and the interior space.

The method of any preceding clause further comprising the step of twisting automatically the second seal with the first plunger relative to the closeout seal in response to a contour of the at least one surface; and distorting automatically at least the second seal according to a contour of the at least one surface.

The method of any preceding clause further comprising the step of providing a second seal apparatus coupled to the closeout seal, wherein the second seal apparatus includes a plunger that operates independently of the first plunger to seal the gap.

It will be understood that various changes in the details, materials, and arrangements of parts and components which have been herein described and illustrated to explain the nature of the dynamic seals between moving components and stationary components may be made by those skilled in the art within the principle and scope of the appended claims. Furthermore, while various features have been described with regard to particular embodiments, it will be appreciated that features described for one embodiment also may be incorporated with the other described embodiments.

What is claimed is:

1. A seal apparatus, comprising:
   a first seal having a first proximal end portion and a first distal end portion;
   a second seal having a second proximal end portion and a second distal end portion, the second distal end portion coupled to the first distal end portion, and the second seal opposite the first seal and defining an interior space therebetween, wherein the first seal and the second seal have substantially the same orientation;
   a closeout seal attached to the first proximal end portion of the first seal; and
   a first plunger attached to the second proximal end portion of the second seal, and the first plunger having a geometry corresponding to a geometry of the closeout seal,
   wherein the first plunger is matingly received by the closeout seal and the first seal and the second seal relate the motion of the first plunger to the closeout seal to seal the interior space, and wherein the first seal biases away from the second seal.

2. The seal apparatus of claim 1, wherein the first seal comprises a first resilient sheet, a second resilient sheet parallel to the first resilient sheet, and a base plate extending between the first resilient sheet and the second resilient sheet at the first proximal end portion of the first seal, and the closeout seal is attached to the base plate.

3. The seal apparatus of claim 2, wherein the second seal comprises a third resilient sheet, a fourth resilient sheet parallel to the third resilient sheet, and a secondary plate extending between the third resilient sheet and the fourth resilient sheet at the second proximal end portion of the second seal, and the first plunger is attached to the secondary plate.

4. The seal apparatus of claim 3, wherein the first seal and the second seal are flexurally related by the first resilient sheet, the second resilient sheet, the third resilient sheet, and the fourth resilient sheet such that the first plunger has a predetermined movement.

5. The seal apparatus of claim 1, wherein the first seal and the second seal are a single piece of material.

6. The seal apparatus of claim 1, wherein the closeout seal defines a recess that receives the first plunger; and wherein the first plunger comprises a projection having a geometry corresponding to a geometry of the recess.

7. The seal apparatus of claim 1, wherein the closeout seal is operably coupled to a second seal apparatus, the second seal apparatus comprising:
   a third seal having a third proximal end portion and a third distal end portion;
   a fourth seal having a fourth proximal end portion and a fourth distal end portion coupled to the third distal end portion of the third seal, the fourth seal opposite the third seal and defining a second interior space therebetween;
a second plunger attached to the second proximal end portion of the second seal and coupled to the first plunger via a lap joint, the second plunger having a geometry generally corresponding to the geometry of the closeout seal; and
wherein the second plunger is matingly received by the closeout seal to seal the second interior space, and the third seal biases away from the fourth seal.

8. A gas turbine nozzle assembly, comprising:
a stationary structure;
a moveable flap adjacent the stationary structure; and
the seal apparatus of claim 1 disposed in a gap between the stationary structure and the moveable flap, at least a portion of the first plunger contacting the stationary structure to seal the gap.

9. The seal apparatus of claim 6, wherein the first plunger is configured to move predominately linearly into and out of the recess in the closeout seal.

10. The seal apparatus of claim 1, wherein the closeout seal is rigidly integrated into a moveable flap.

11. The seal apparatus of claim 1, wherein the closeout seal comprises a lip that engages the first plunger when the first plunger is received by the closeout seal.

12. A seal assembly, comprising:
a first seal having a first proximal end portion and a first distal end portion and defining a first plenum;
a second seal opposite the first seal, the second seal having a second proximal end portion, and a second distal end portion coupled to the first distal end portion of the first seal and defining a second plenum in fluid communication with the first plenum;
a closeout seal attached to the first proximal end portion of the first seal and defining an interior cavity in fluid communication with the first plenum; and
a plunger attached to the second proximal end portion of the second seal, wherein the plunger is matingly received by the closeout seal, and wherein the interior cavity of the closeout seal is configured to receive a supply of fluid to thermally regulate the seal assembly to seal a gap between a movable flap and a stationary structure.

13. The seal assembly of claim 12, wherein the movable flap defines a channel, the supply of fluid is provided by a flow of air supplied from the channel, and the channel is in fluid communication with the interior cavity of the closeout seal.

14. The seal assembly of claim 12, wherein the closeout seal defines a first outlet opening in fluid communication with an environment surrounding the seal assembly and in fluid communication with the interior cavity.

15. The seal assembly of claim 14, wherein the plunger defines a second outlet opening in fluid communication with the environment surrounding the seal assembly and in fluid communication with the second plenum.

16. The seal assembly of claim 15, wherein the supply of fluid exits the second outlet opening to create a film seal below the plunger.

17. A method of sealing a dynamic gap using a first seal apparatus, the first seal apparatus comprising: a first seal having a first proximal end portion and a first distal end portion; a second seal having a second proximal end portion and a second distal end portion coupled to the first distal end portion of the first seal, the second seal opposite the first seal and forming an interior space therebetween; a closeout seal attached to the first proximal end portion of the first seal; and a first plunger attached to the second proximal end portion of the second seal, wherein the first plunger is matingly received by a recess in the closeout seal to seal the interior space, and wherein the first seal biases away from the second seal to seal the dynamic gap, the method comprising:
contacting at least one surface defining the dynamic gap with the first plunger; and
moving at least the first plunger automatically relative to the recess in response to movement in the at least one surface.

18. The method of claim 17, wherein the moving further comprises moving the first plunger predominantly linearly in and out of the closeout seal automatically in response to movement in the at least one surface to seal the dynamic gap and the interior space.

19. The method of claim 17, further comprising twisting automatically the second seal with the first plunger relative to the closeout seal in response to a contour of the at least one surface; and distorting automatically at least the second seal according to a contour of the at least one surface.

20. The method of claim 17, further comprising providing a second seal apparatus coupled to the closeout seal, wherein the second seal apparatus includes a second plunger operates independently of the first plunger to seal the dynamic gap.

21. A seal apparatus, comprising:
a first seal having a first proximal end portion and a first distal end portion;
a second seal having a second proximal end portion and a second distal end portion, the second distal end portion coupled to the first distal end portion, and the second seal opposite the first seal and defining an interior space therebetween, wherein the first seal and the second seal form a hairpin-shape;
a closeout seal attached to the first proximal end portion of the first seal; and
a first plunger attached to the second proximal end portion of the second seal, and the first plunger having a geometry corresponding to a geometry of the closeout seal,
wherein the first plunger is matingly received by the closeout seal and the first seal and the second seal relate the motion of the first plunger to the closeout seal to seal the interior space, and wherein the first seal biases away from the second seal.

22. A seal apparatus, comprising:
a first seal having a first proximal end portion and a first distal end portion;
a second seal having a second proximal end portion and a second distal end portion, the second distal end portion coupled to the first distal end portion, and the second seal opposite the first seal and defining an interior space therebetween;
a closeout seal attached to the first proximal end portion of the first seal; and
a first plunger attached to the second proximal end portion of the second seal, and the first plunger having a geometry corresponding to a geometry of the closeout seal,
wherein the first plunger is matingly received by the closeout seal to seal the interior space and the first seal biases away from the second seal, and
wherein the first seal and the second seal are a single piece of material.

* * * * *